US012791776B2

(12) United States Patent
Mitobe et al.

(10) Patent No.: US 12,791,776 B2
(45) Date of Patent: Nov. 10, 2026

(54) OPTICAL LAMINATE AND IMAGE DISPLAY DEVICE

(71) Applicant: FUJIFILM Corporation, Tokyo (JP)

(72) Inventors: Fumitake Mitobe, Kanagawa (JP); Ryoji Goto, Kanagawa (JP); Yujiro Yanai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 224 days.

(21) Appl. No.: 18/789,108

(22) Filed: Jul. 30, 2024

(65) Prior Publication Data

US 2024/0402408 A1 Dec. 5, 2024

Related U.S. Application Data

(63) Continuation of application No. PCT/JP2023/002549, filed on Jan. 27, 2023.

(30) Foreign Application Priority Data

Feb. 4, 2022 (JP) ................................ 2022-016559
Aug. 29, 2022 (JP) ................................ 2022-135706

(51) Int. Cl.
*G02B 5/30* (2006.01)

(52) U.S. Cl.
CPC ......... *G02B 5/3083* (2013.01); *G02B 5/3016* (2013.01)

(58) Field of Classification Search
CPC ...... G02B 5/3083; G02B 5/30; G02B 5/3016; B32B 7/023; G02F 1/1335; G09F 9/30; H10K 50/86
See application file for complete search history.

(56) References Cited

U.S. PATENT DOCUMENTS 3,205,775 A 9/1965 Marks
2009/0027599 A1 * 1/2009 Ohgaru ................ G02F 1/1335 349/96

(Continued)

FOREIGN PATENT DOCUMENTS

JP 2001-108825 A 4/2001
JP 2008-165201 A 7/2008

(Continued)

OTHER PUBLICATIONS

International Search Report issued in PCT/JP2023/002549 on Mar. 14, 2023.

(Continued)

*Primary Examiner* — Jonathan Y Jung
(74) *Attorney, Agent, or Firm* — Edwards Neils LLC; Jean C. Edwards, Esq.

(57) ABSTRACT

An optical laminate having excellent light transmitting properties is used for an image display device, includes in order: a first light absorption anisotropic layer; first and second retardation layers; and a second light absorption anisotropic layer, in which the first and second retardation layers are λ/2 wavelength plates, an angle formed between a slow axis of the first and second retardation layers is within a range of 45°±10°, the first and the second light absorption anisotropic layers contain a dichroic substance, an angle formed between a transmittance central axis of the first light absorption anisotropic layer and a normal direction of a surface thereof is 0° or more and 45° or less, and an angle formed between a transmittance central axis of the second light absorption anisotropic layer and a normal direction of a surface thereof is 0° or more and 45° or less.

20 Claims, 1 Drawing Sheet

(56) References Cited

U.S. PATENT DOCUMENTS

| | | | | |
|---|---|---|---|---|
| 2010/0092784 | A1 | 4/2010 | Kamada et al. | |
| 2013/0286329 | A1* | 10/2013 | Goto | G02B 5/3016 349/194 |
| 2018/0172889 | A1 | 6/2018 | Yanai et al. | |
| 2019/0064557 | A1 | 2/2019 | Yanai | |
| 2019/0154896 | A1* | 5/2019 | Yanai | G02B 5/3016 |
| 2019/0219753 | A1* | 7/2019 | Kaneiwa | C09K 19/32 |
| 2021/0088854 | A1 | 3/2021 | Shin et al. | |
| 2022/0206302 | A1 | 6/2022 | Ishiyama et al. | |
| 2023/0037017 | A1 | 2/2023 | Yamada et al. | |

FOREIGN PATENT DOCUMENTS

| | | | |
|---|---|---|---|
| JP | 2008-268901 | A | 11/2008 |
| JP | 2012-022148 | A | 2/2012 |
| JP | 2020-529627 | A | 10/2020 |
| WO | 2013/100115 | A1 | 7/2013 |
| WO | 2017/022591 | A1 | 2/2017 |
| WO | 2017/199656 | A1 | 11/2017 |
| WO | 2018/003380 | A1 | 1/2018 |
| WO | 2021/054099 | A1 | 3/2021 |
| WO | 2021/177308 | A1 | 9/2021 |

OTHER PUBLICATIONS

Written Opinion issued in PCT/JP2023/002549 on Mar. 14, 2023.
International Preliminary Report on Patentability completed by WIPO on Aug. 6, 2024 in connection with International Patent Application No. PCT/JP2023/002549.

* cited by examiner

OPTICAL LAMINATE AND IMAGE DISPLAY DEVICE

CROSS-REFERENCE TO RELATED APPLICATIONS

This application is a Continuation of PCT International Application No. PCT/JP2023/002549 filed on Jan. 27, 2023, which was published under PCT Article 21 (2) in Japanese, and which claims priority under 35 U.S.C. § 119 (a) to Japanese Patent Application No. 2022-016559, filed on Feb. 4, 2022, and Japanese Patent Application No. 2022-135706, filed on Aug. 29, 2022. All the above applications are hereby expressly incorporated by reference, in their entirety, into the present application.

BACKGROUND OF THE INVENTION

1. Field of the Invention

The present invention relates to an optical laminate and an image display device.

2. Description of the Related Art

An image display device has been used in various scenes, and it may be required to control a viewing angle such as reflected glare of an image depending on applications of the image display device. For example, in a case where an in-vehicle display such as a car navigation system is used, light emitted from a display screen may be reflected on a windshield or window glass.

JP2008-165201A describes, as an optical film having a partition effect that is visible from the front but appears dark and is not visible from an oblique angle, "an optical film having a retardation film and a polarizing film on both surfaces of the retardation film, in which the polarizing film contains at least a polarizer, and the absorption axis of the polarizer is oriented substantially perpendicular to a polarizing film surface" ([0005], [claim 1]).

SUMMARY OF THE INVENTION

The present inventors applied the optical film described in JP2008-165201A to an image display device to evaluate characteristics of the optical film, and found that, for example, in a case where the image display device is used for a car navigation system or the like, the light shielding properties may not be sufficiently exhibited in a direction (for example, an oblique direction) other than a specific direction (for example, a front direction) in which the transmittance is excellent, and an image may be reflected on a peripheral member such as a windshield or window glass.

Accordingly, an object of the present invention is to provide an optical laminate having excellent light transmitting properties in a specific direction and having good light shielding properties in all directions except for the specific direction in a case of being used for an image display device, and an image display device.

The present inventors have conducted intensive studies in order to achieve the above-described object, and as a result, found that in a case where, between two light absorption anisotropic layers having transmittance central axes present in a predetermined direction, two retardation layers, each of which consists of a λ/2 wavelength plate, are installed so that a predetermined axial relationship is created, light transmitting properties in a specific direction are excellent and light shielding properties in all directions except for the specific direction are good in using for an image display device, and completed the present invention.

That is, the present inventors have found that the above-described object can be achieved by employing the following configurations.

[1] An optical laminate comprising in order: a first light absorption anisotropic layer; a first retardation layer; a second retardation layer; and a second light absorption anisotropic layer, in which the first retardation layer and the second retardation layer are λ/2 wavelength plates, an angle formed between a slow axis of the first retardation layer and a slow axis of the second retardation layer is within a range of 45°±10°, the first light absorption anisotropic layer and the second light absorption anisotropic layer contain a dichroic substance, an angle formed between a transmittance central axis of the first light absorption anisotropic layer and a normal direction of a surface of the first light absorption anisotropic layer is 0° or more and 45° or less, and an angle formed between a transmittance central axis of the second light absorption anisotropic layer and a normal direction of a surface of the second light absorption anisotropic layer is 0° or more and 45° or less.

[2] The optical laminate according to [1], in which a transmittance central axis of the first light absorption anisotropic layer and a transmittance central axis of the second light absorption anisotropic layer are parallel to each other.

[3] The optical laminate according to [1] or [2], in which the first retardation layer and the second retardation layer are layers formed of a composition containing a disk-like liquid crystal compound.

[4] The optical laminate according to [1] or [2], in which the first retardation layer and the second retardation layer are layers formed of a composition containing a rod-like liquid crystal compound having reverse wavelength dispersibility.

[5] The optical laminate according to [1] or [2], in which any one of the first retardation layer or the second retardation layer is a layer formed of a composition containing a rod-like liquid crystal compound and the other is a layer formed of a composition containing a disk-like liquid crystal compound.

[6] The optical laminate according to [5], in which the rod-like liquid crystal compound is a rod-like liquid crystal compound having reverse wavelength dispersibility.

[7] The optical laminate according to any one of [1] to [6], in which at least one of the first retardation layer or the second retardation layer is a layer formed of two retardation layers.

[8] The optical laminate according to any one of [1] to [7], in which a positive C-plate is provided between the first retardation layer and the second retardation layer.

[9] The optical laminate according to any one of [1] to [7], in which a third light absorption anisotropic layer containing a dichroic substance is provided between the first retardation layer and the second retardation layer, and an angle formed between a transmittance central axis of the third light absorption anisotropic layer and a normal direction of a surface of the third light absorption anisotropic layer is 0° or more and 45° or less.

[10] The optical laminate according to any one of [1] to [7], in which the first retardation layer and the second retardation layer are in direct contact with each other or are laminated via only at least one of an adhesive layer, a pressure sensitive adhesive layer, or an alignment film.

[11] An image display device comprising the optical laminate according to any one of [1] to [10].

According to the present invention, it is possible to provide an optical laminate having excellent light transmitting properties in a specific direction and having good light shielding properties in all directions except for the specific direction in a case of being used for an image display device, and an image display device.

DESCRIPTION OF THE PREFERRED EMBODIMENTS

Figure 1:
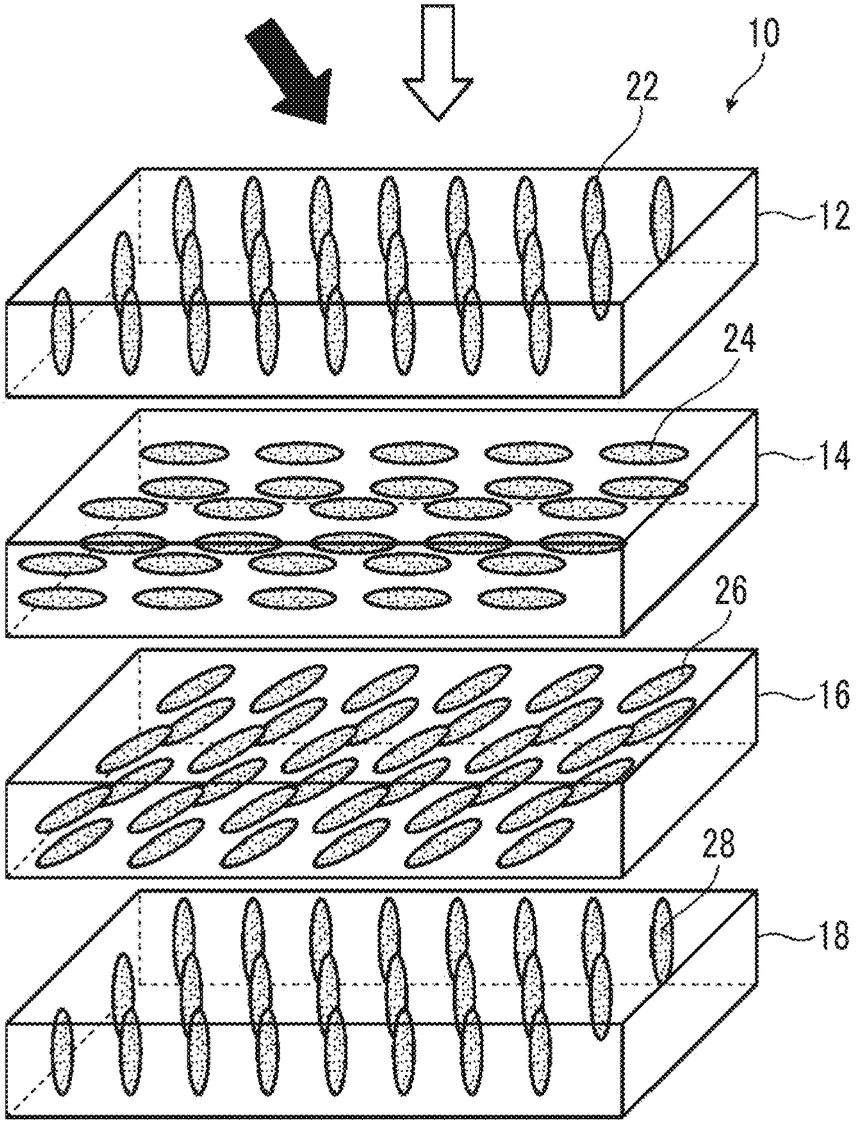
FIG. 1 is a schematic diagram showing an example of an optical laminate according to the present invention.

Hereinafter, the present invention will be described in detail.

The following description of configuration requirements is based on representative embodiments of the present invention, but the present invention is not limited to the embodiments.

In the present specification, a numerical range expressed using "to" means a range including numerical values before and after "to" as a lower limit value and an upper limit value.

In addition, in the present specification, the terms parallel and orthogonal do not mean only strict parallel and strict orthogonal, respectively, but rather a range of parallel ±5° and a range of orthogonal ±5°, respectively.

In addition, in the present specification, as each component, a substance corresponding to each component may be used alone, or two or more kinds of substances may be used in combination. Here, in a case where two or more kinds of substances are used in combination for each component, the content of the component refers to a total content of the substances used in combination unless otherwise specified.

In addition, in the present specification, "(meth) acrylate" represents "acrylate" or "methacrylate", "(meth) acryl" represents "acryl" or "methacryl", and "(meth) acryloyl" represents "acryloyl" or "methacryloyl".

In the present specification, Re(λ) and Rth(λ) represent an in-plane retardation and a thickness-direction retardation at a wavelength λ, respectively. Unless otherwise specified, the wavelength λ is 550 nm.

In the present invention, Re(λ) and Rth(λ) are values measured at the wavelength λ in AxoScan OPMF-1 (manufactured by Opto Science, Inc.). By inputting an average refractive index ((nx+y+nz)/3) and a film thickness (d(μm)) to AxoScan, the followings are calculated. Slow Axis Direction (°)

$$Re(\lambda) = R0(\lambda)$$

$$Rth(\lambda) = ((nx + ny)/2 - nz) \times d$$

R0(λ) means Re(λ), which is displayed as a numerical value calculated by AxoScan OPMF-1.

In the present specification, the refractive indices nx, ny, and nz are measured using an Abbe refractometer (NAR-4T, manufactured by Atago Co., Ltd.) and a sodium lamp (λ=589 nm) as a light source. In addition, in the measurement of wavelength dependence, it can be measured with a multi-wavelength Abbe refractometer DR-M2 (manufactured by Atago Co., Ltd.) in combination with a dichroic filter.

In addition, values in Polymer Handbook (John Wiley & Sons, Inc.) and catalogs of various optical films can be used. Examples of the average refractive indices of main optical films are as follows: cellulose acylate (1.48), cycloolefin polymer (1.52), polycarbonate (1.59), polymethylmethacrylate (1.49), and polystyrene (1.59).

In addition, the bonding direction of a divalent group (for example, —COO—) described in the present specification is not particularly limited. For example, in a case where L in X-L-Y is —COO— and in a case where the position bonded to the X side is defined as *1 and the position bonded to the Y side is defined as *2, L may be *1-O—CO-*2 or *1-CO—O-*2.

Optical Laminate

An optical laminate according to the embodiment of the present invention has a first light absorption anisotropic layer, a first retardation layer, a second retardation layer, and a second light absorption anisotropic layer in this order.

In addition, in the optical laminate according to the embodiment of the present invention, the first retardation layer and the second retardation layer are λ/2 wavelength plates, and the angle formed between a slow axis of the first retardation layer and a slow axis of the second retardation layer is within a range of 45°±10°.

In addition, in the optical laminate according to the embodiment of the present invention, the first light absorption anisotropic layer and the second light absorption anisotropic layer contain a dichroic substance, the angle formed between a transmittance central axis of the first light absorption anisotropic layer and a normal direction of a surface of the first light absorption anisotropic layer is 0° or more and 45° or less, and the angle formed between a transmittance central axis of the second light absorption anisotropic layer and a normal direction of a surface of the second light absorption anisotropic layer is 0° or more and 45° or less.

Here, in the first retardation layer and the second retardation layer, the "λ/2 wavelength plate" refers to a retardation layer whose in-plane retardation is approximately ½ of the wavelength, and specifically refers to a retardation layer whose in-plane retardation Re(550) at a wavelength of 550 nm is 220 nm to 320 nm.

In addition, the transmittance central axis of each of the first light absorption anisotropic layer and the second light absorption anisotropic layer means a direction in which the highest transmittance is exhibited in the measurement of the transmittance by changing a tilt angle (polar angle) and a tilt direction (azimuthal angle) with respect to the normal direction of the surface of each light absorption anisotropic layer.

Specifically, the Mueller matrix at a wavelength of 550 nm is measured using AxoScan OPMF-1 (manufactured by Opto Science, Inc.). More specifically, in the measurement, an azimuthal angle at which the transmittance central axis is inclined is first searched for, the Mueller matrix at a wavelength of 550 nm is measured while the polar angle which is the angle with respect to the normal direction of the surface of the light absorption anisotropic layer is changed from −70° to 70° at intervals of 1° in the surface (the plane that has the transmittance central axis and is orthogonal to the layer surface) having the normal direction of the light absorption anisotropic layer along the azimuthal angle, and the transmittance of the light absorption anisotropic layer is derived. As a result, the direction in which the highest transmittance is exhibited is defined as the transmittance central axis.

Further, the transmittance central axis means a direction (the major axis direction of a molecule) of the absorption axis of the dichroic substance contained in each light absorption anisotropic layer.

Figure 2:
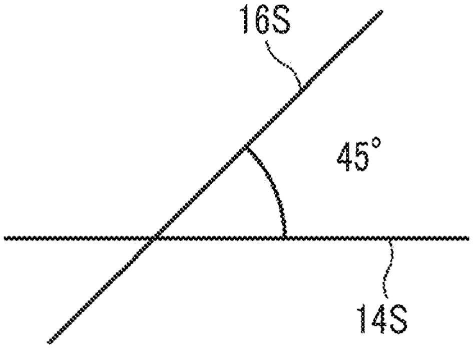
FIG. 2 is a diagram showing the angular relationship between a slow axis of a first retardation layer and a slow axis of a second retardation layer in a case of being observed from the direction of the white arrow in FIG. 1.

FIG. 1 is a schematic diagram showing an example of the optical laminate according to the embodiment of the present invention, and FIG. 2 is a diagram showing the angular relationship between the slow axis of the first retardation layer and the slow axis of the second retardation layer, observed from the direction of the white arrow in FIG. 1.

An optical laminate 10 shown in FIG. 1 has a first light absorption anisotropic layer 12, a first retardation layer 14, a second retardation layer 16, and a second light absorption anisotropic layer 18 in this order.

In addition, the first light absorption anisotropic layer 12 and the second light absorption anisotropic layer 18 contain dichroic substances 22 and 28, respectively. In FIG. 1, in each of the first light absorption anisotropic layer 12 and the second light absorption anisotropic layer 18, the angle between a transmittance central axis and a normal direction of a surface of each light absorption anisotropic layer is 0°.

In addition, both the first retardation layer 14 and the second retardation layer 16 are λ/2 wavelength plates, and contain optional liquid crystal compounds 24 and 26, respectively. In the first retardation layer 14 and the second retardation layer 16 in FIG. 1, the angle formed between a slow axis 14S of the first retardation layer 14 and a slow axis 16S of the second retardation layer 16 is 45° as shown in FIG. 2.

In the present invention, as described above, between the first light absorption anisotropic layer and the second light absorption anisotropic layer having transmittance central axes present in a predetermined direction, the first retardation layer and the second retardation layer, each of which consists of a λ/2 wavelength plate, are disposed so that a predetermined axial relationship is satisfied, whereby light transmitting properties in a specific direction are excellent and light shielding properties in all directions other than the specific direction are good in using for an image display device.

Although the details thereof are not clear, the present inventors have presumed as follows.

First, as shown in FIG. 1, in a case where the light incident from the (specific) direction of the white arrow of FIG. 1 matches the direction of the transmittance central axis of the first light absorption anisotropic layer, the unpolarized light is transmitted without being affected by the first light absorption anisotropic layer. Therefore, the polarization state is not changed by the first retardation layer and the second retardation layer, and the light is also transmitted through the second light absorption anisotropic layer.

Meanwhile, the light incident from the direction of the black arrow of FIG. 1 does not match the direction of the transmittance central axis of the first light absorption anisotropic layer as shown in FIG. 1, and the longitudinal wave light (hereinafter, referred to as "P-polarized light" in this paragraph) is absorbed by the first light absorption anisotropic layer (dichroic substance). Therefore, the light transmitted through the first light absorption anisotropic layer is light that is rich in transverse wave light (hereinafter, referred to as "S-polarized light" in this paragraph) (light with a large amount of S-polarized light).

Since the S-polarized light transmitted through the first light absorption anisotropic layer is converted into P-polarized light by the first retardation layer (λ/2 wavelength plate), the light transmitted through the first retardation layer is light that is rich in P-polarized light (light with a large amount of P-polarized light). However, the S-polarized light parallel or orthogonal to the slow axis of the first retardation layer is not converted into P-polarized light, and thus the S-polarized light also remains.

Next, in the second retardation layer (λ/2 wavelength plate) forming an angle of 45°±10° with the slow axis of the first retardation layer, the P-polarized light converted by the first retardation layer is transmitted as it is, but the S-polarized light that has not been converted by the first retardation layer is converted into P-polarized light.

As a result, it is conceivable that the light transmitted through the first retardation layer and the second retardation layer is mostly P-polarized light.

Therefore, since the light transmitted through the first retardation layer and the second retardation layer is absorbed by the second light absorption anisotropic layer as P-polarized light, it is conceivable that the light incident from the direction of the black arrow of FIG. 1 is almost absorbed.

From the above, it is conceivable that, in a case where the optical laminate according to the embodiment of the present invention is used for an image display device, light transmitting properties in a specific direction are excellent and light shielding properties in all directions other than the specific direction are good.

Hereinafter, the layers of the optical laminate according to the embodiment of the present invention will be described in detail. However, in a case where no particular distinction is required for the description, the first light absorption anisotropic layer and the second light absorption anisotropic layer are collectively referred to as "light absorption anisotropic layer", and the first retardation layer and the second retardation layer are collectively referred to as "retardation layer".

Light Absorption Anisotropic Layer

The light absorption anisotropic layer of the optical laminate according to the embodiment of the present invention is a light absorption anisotropic layer containing a dichroic substance, and is preferably a light absorption anisotropic layer containing a liquid crystal compound together with the dichroic substance, and more preferably a layer obtained by fixing the alignment state of a liquid crystal compound and a dichroic substance.

In addition, the angle between the transmittance central axis of the light absorption anisotropic layer and the normal direction of the surface of the light absorption anisotropic layer is 0° or more and 45° or less, preferably 0° or more and less than 45°, more preferably 0° or more and 35° or less, and still more preferably 0° or more and less than 35°.

In the present invention, due to the reason that the light transmitting properties in a specific direction are improved, the transmittance central axis of the first light absorption anisotropic layer and the transmittance central axis of the second light absorption anisotropic layer are preferably parallel to each other.

Dichroic Substance

In the present invention, the dichroic substance means a coloring agent having different absorbances depending on directions. The dichroic substance may or may not exhibit liquid crystallinity.

The dichroic substance is not particularly limited, and examples thereof include a visible light absorbing substance (dichroic coloring agent), a light emitting substance (fluorescent substance and phosphorescent substance), an ultraviolet absorbing substance, an infrared absorbing substance, a non-linear optical substance, a carbon nanotube, and an inorganic substance (for example, quantum rod). Further, known dichroic substances (dichroic coloring agents) of the related art can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs t[0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0014] to [0032] of JP2018-053167A, paragraphs [0014] to [0033] of JP2020-11716A, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, paragraphs [0014] to [0034] of WO2018/164252A, paragraphs [0021] to [0030] of WO2018/186503A, paragraphs [0043] to [0063] of WO2019/189345A, paragraphs [0043] to [0085] of WO2019/225468A, paragraphs [0050] to [0074] of WO2020/004106A, and paragraphs [0015] to [0038] of WO2021/044843A.

As the dichroic substance, a dichroic azo coloring agent compound is preferable.

The dichroic azo coloring agent compound means an azo coloring agent compound having different absorbances depending on directions. The dichroic azo coloring agent compound may or may not exhibit liquid crystallinity. In a case where the dichroic azo coloring agent compound exhibits its liquid crystallinity, any of nematic properties or smectic properties may be exhibited. The temperature range in which the liquid crystal phase is exhibited is preferably room temperature (approximately 20° C. to 28° C.) to 300° C., and from the viewpoint of handleability and manufacturing suitability, more preferably 50° C. to 200° C.

In the present invention, from the viewpoint of tint adjustment, it is preferable to use at least one coloring agent compound (first dichroic azo coloring agent compound) having a maximal absorption wavelength in a wavelength range of 560 to 700 nm and at least one coloring agent compound (second dichroic azo coloring agent compound) having a maximal absorption wavelength in a wavelength range of 455 nm or more and less than 560 nm.

In the present invention, three or more dichroic azo coloring agent compounds may be used in combination. For example, from the viewpoint of making the light absorption anisotropic layer close to black, it is preferable to use the first dichroic azo coloring agent compound, the second dichroic azo coloring agent compound, and at least one coloring agent compound (third dichroic azo coloring agent compound) having a maximal absorption wavelength in a wavelength range of 380 nm or more and less than 455 nm in combination.

In the present invention, the dichroic azo coloring agent compound preferably has a crosslinkable group.

Examples of the crosslinkable group include a (meth) acryloyl group, an epoxy group, an oxetanyl group, and a styryl group, and among these, a (meth) acryloyl group is preferable.

The content of the dichroic substance is not particularly limited, but due to the reason that the alignment degree of the formed light absorption anisotropic layer is further increased, it is preferably 3% by mass or more, more preferably 8% by mass or more, still more preferably 10% by mass or more, and particularly preferably 10% to 30% by mass with respect to the total mass of the light absorption anisotropic layer. In a case where a plurality of dichroic substances are used in combination, the total amount of the plurality of dichroic substances is preferably within the above range.

Liquid Crystal Compound

The light absorption anisotropic layer preferably contains a liquid crystal compound. In this manner, the dichroic substance can be aligned with a higher alignment degree while the precipitation of the dichroic substance is suppressed.

Both a polymer liquid crystal compound and a low-molecular-weight liquid crystal compound can be used as the liquid crystal compound, and a polymer liquid crystal compound is preferable from the viewpoint that the alignment degree can be increased. Further, a polymer liquid crystal compound and a low-molecular-weight liquid crystal compound may be used in combination as the liquid crystal compound.

Here, the "polymer liquid crystal compound" refers to a liquid crystal compound having a repeating unit in the chemical structure.

In addition, the "low-molecular-weight liquid crystal compound" refers to a liquid crystal compound having no repeating unit in the chemical structure.

Examples of the polymer liquid crystal compound include thermotropic liquid crystal polymers described in JP2011-237513A and polymer liquid crystal compounds described in paragraphs to of WO2018/199096A.

Examples of the low-molecular-weight liquid crystal compound include liquid crystal compounds described in paragraphs [0072] to [0088] to of JP2013-228706A. Among these, a smectic liquid crystal compound is preferable.

From the viewpoint of a further increase of the alignment degree of the dichroic substance, a polymer liquid crystal compound having a repeating unit represented by Formula (1) (hereinafter, also simply referred to as "repeating unit (1)") is preferable as the liquid crystal compound.

(1)

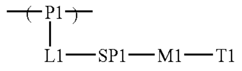

In Formula (1), P1 represents a main chain of the repeating unit, L1 represents a single bond or a divalent linking group, SP1 represents a spacer group, M1 represents a mesogenic group, and T1 represents a terminal group.

Examples of the main chain of the repeating unit, represented by P1, include groups represented by Formulae (P1-A) to (P1-D). Among these, from the viewpoint of diversity and handleability of a monomer serving as a raw material, a group represented by Formula (P1-A) is preferable.

(P1-A)

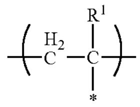

(P1-B)

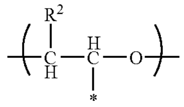

(P1-C)

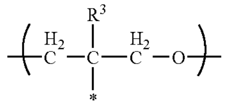

(P1-D)

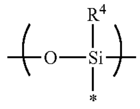

In Formulae (P1-A) to (P1-D), the symbol "*" denotes a bonding position to L1 in Formula (1).

In Formulae (P1-A) to (P1-D), $R^1$, $R^2$, $R^3$, and $R^4$ each independently represent a hydrogen atom, a halogen atom, a cyano group, an alkyl group having 1 to 10 carbon atoms, or an alkoxy group having 1 to 10 carbon atoms. The above-described alkyl group may be a linear or branched alkyl group, or an alkyl group having a cyclic structure (cycloalkyl group). Further, the number of carbon atoms of the alkyl group is preferably 1 to 5.

The group represented by Formula (P1-A) is preferably a unit of a partial structure of a poly (meth) acrylic acid ester obtained by polymerization of a (meth) acrylic acid ester.

The group represented by Formula (P1-B) is preferably an ethylene glycol unit formed by ring-opening polymerization of an epoxy group of a compound having the epoxy group.

The group represented by Formula (P1-C) is preferably a propylene glycol unit formed by ring-opening polymerization of an oxetane group of a compound having the oxetane group.

The group represented by Formula (P1-D) is preferably a siloxane unit of a polysiloxane obtained by polycondensation of a compound having at least one of an alkoxysilyl group or a silanol group. Here, examples of the compound having at least one of an alkoxysilyl group or a silanol group include a compound having a group represented by Formula $SiR^{14}(OR^{15})_2$—. In the formula, $R^{14}$ has the same definition as that for $R_{14}$ in Formula (P1-D), and a plurality of $R^{15}$'s each independently represent a hydrogen atom or an alkyl group having 1 to 10 carbon atoms.

In Formula (1), L1 represents a single bond or a divalent linking group.

Examples of the divalent linking group represented by L1 include —C(O)O—, —O—, —S—, —C(O) $NR^3$—, —$SO^2$—, and —$NR^3R^4$—. In the formulae, $R^3$ and $R^4$ each independently represent a hydrogen atom or an alkyl group having 1 to 6 carbon atoms which may have a substituent.

In a case where P1 is a group represented by Formula (P1-A), L1 is preferably a group represented by —C(O)O— from the viewpoint of a further increase of the alignment degree of the dichroic substance.

In a case where P1 is a group represented by any of Formula (P1-B) to Formula (P1-D), L1 is preferably a single bond from the viewpoint of a further increase of the alignment degree of the dichroic substance.

In Formula (1), the spacer group represented by SP1 preferably includes at least one structure selected from the group consisting of an oxyethylene structure, an oxypropylene structure, a polysiloxane structure, and an alkylene fluoride structure, from the viewpoint of easily exhibiting liquid crystallinity, availability of raw materials, and the like.

Here, the oxyethylene structure represented by SP1 is preferably a group represented by $*—(CH_2—CH_2O)_{n1}—*$. In the formula, n1 represents an integer of 1 to 20, and "*" represents a bonding position to L1 or M1 in Formula (1). From the viewpoint of a further increase of the alignment degree of the dichroic substance, n1 is preferably an integer of 2 to 10, more preferably an integer of 2 to 4, and still more preferably 3.

In addition, the oxypropylene structure represented by SP1 is preferably a group represented by $*—(CH(CH_3)—CH_2O)_{n2}—*$ from the viewpoint of a further increase of the alignment degree of the dichroic substance. In the formula, n2 represents an integer of 1 to 3, and * represents a bonding position to L1 or M1.

In addition, the polysiloxane structure represented by SP1 is preferably a group represented by $*—(Si(CH_3)_2—O)_{n3}—*$ from the viewpoint of a further increase of the alignment degree of the dichroic substance. In the formula, n3 represents an integer of 6 to 10, and * represents a bonding position to L1 or M1.

In addition, the alkylene fluoride structure represented by SP1 is preferably a group represented by $*—(CF_2—CF_2)_{n4}—*$ from the viewpoint of a further increase of the alignment degree of the dichroic substance. In the formula, n4 represents an integer of 6 to 10, and * represents a bonding position to L1 or M1.

In Formula (1), the mesogenic group represented by M1 is a group showing the main skeleton of liquid crystal molecules contributing to the formation of liquid crystal. The liquid crystal molecules exhibit liquid crystallinity that is in an intermediate state (mesophase) between a crystal state and an isotropic liquid state. The mesogenic group is not particularly limited, and for example, the description on pages 7 to 16 of "Flussige Kristalle in Tabellen II" (VEB Deutsche Verlag fur Grundstoff Industrie, Leipzig, 1984) and the description in Chapter 3 of Liquid Crystal Handbook (Maruzen, 2000) edited by Liquid Crystal Handbook Editing Committee can be referred to.

For example, a group having at least one cyclic structure selected from the group consisting of an aromatic hydrocarbon group, a heterocyclic group, and an alicyclic group is preferable as the mesogenic group.

From the viewpoint of a further increase of the alignment degree of the dichroic substance, the mesogenic group preferably has an aromatic hydrocarbon group, more preferably 2 to 4 aromatic hydrocarbon groups, and still more preferably 3 aromatic hydrocarbon groups.

From the viewpoint of exhibition of liquid crystallinity, adjustment of liquid crystal phase transition temperature, availability of raw materials, and synthetic suitability, and from the viewpoint of a further increase of the alignment degree of the dichroic substance, the mesogenic group is preferably a group represented by Formula (M1-A) or Formula (M1-B), and more preferably a group represented by Formula (M1-B).

(M1-A)

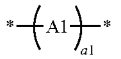

(M1-B)

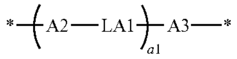

In Formula (M1-A), A1 is a divalent group selected from the group consisting of an aromatic hydrocarbon group, a heterocyclic group, and an alicyclic group. These groups may be substituted with an alkyl group, a fluorinated alkyl group, an alkoxy group, or a substituent.

The divalent group represented by A1 is preferably a 4-to 6-membered ring. Further, the divalent group represented by A1 may be a monocycle or a fused ring.

The symbol * represents a bonding position to SP1 or T1.

Examples of the divalent aromatic hydrocarbon group represented by A1 include a phenylene group, a naphthylene group, a fluorene-diyl group, an anthracene-diyl group, and a tetracene-diyl group, and from the viewpoint of diversity in design of the mesogenic skeleton, availability of raw materials, and the like, a phenylene group or a naphthylene group is preferable, and a phenylene group is more preferable.

The divalent heterocyclic group represented by A1 may be either aromatic or non-aromatic, and is preferably a divalent aromatic heterocyclic group from the viewpoint of a further increase of the alignment degree of the dichroic substance.

Examples of the atom other than the carbon atom of the divalent aromatic heterocyclic group include a nitrogen atom, a sulfur atom, and an oxygen atom. In a case where the aromatic heterocyclic group has a plurality of atoms constituting a ring other than the carbon atom, these atoms may be the same or different from each other.

Specific examples of the divalent aromatic heterocyclic group include a pyridylene group (pyridine-diyl group), a pyridazine-diyl group, an imidazole-diyl group, thienylene (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimide-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 is 2 or more, a plurality of A1's may be the same or different from each other.

In Formula (M1-B), A2 and A3 each independently represent a divalent group selected from the group consisting of an aromatic hydrocarbon group, a heterocyclic group, and an alicyclic group. Since specific examples and preferable aspects of A2 and A3 are the same as those of A1 of Formula (M1-A), the description thereof will be omitted.

In Formula (M1-B), a2 represents an integer of 1 to 10. In a case where a2 is 2 or more, a plurality of A2's may be the same or different from each other, a plurality of A3's may be the same or different from each other, and a plurality of LA1's may be the same or different from each other. From the viewpoint of a further increase of the alignment degree of the dichroic substance, a2 is preferably an integer of 2 or more, and more preferably 2.

In Formula (M1-B), in a case where a2 is 1, LA1 is a divalent linking group. In a case where a2 is 2 or more, a plurality of LA1's each independently represent a single bond or a divalent linking group, and at least one of the plurality of LA's is a divalent linking group. In a case where a2 is 2, it is preferable that one of the two LA1's be a divalent linking group and the other of the two LA1's be a single bond, from the viewpoint of a further increase of the alignment degree of the dichroic substance.

In Formula (M1-B), examples of the divalent linking group represented by LA1 include —O—, $—(CH_2)_g—$, $—(CF_2)_g—$, $—Si(CH_3)_2—$, $—(Si(CH_3)_2O)_g—$, $—(OSi(CH_3)_2)_g—$(g represents an integer of 1 to 10), —N(Z)—, —C(Z)=C(Z')—, —C(Z)=N—, $—C(Z)_2—C(Z')_2—$, —C(O)—, —OC(O)—, —O—C(O)O—, —N(Z)C(O)—, —C(Z)=C (Z')—C(O)O—, —C(Z)=N—, —C(Z)=C (Z')—C(O) N(Z")—, —C(Z)=C (Z')—C(O)—S—, —C(Z)=N—N=C(Z')—(Z, Z', and Z" each independently represent a hydrogen atom, a C1 to C4 alkyl group, a cycloalkyl group, an aryl group, a cyano group, or a halogen atom), —C≡C—, —N=N—, —S—, —S(O)—, —S(O)(O)—, —(O)S(O)O—, —O(O)S(O)O—, and —SC(O). Among these, —C(O)O— is preferable from the viewpoint of a further increase of the alignment degree of the dichroic substance. LA1 may be a group formed by combining two or more of the above groups.

Examples of the terminal group represented by T1 in Formula (1) include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—: R represents an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a (meth) acryloyloxy group-containing group. Examples of the (meth) acryloyloxy group-containing group include a group represented by -L-A (L represents a single bond or a linking group. Specific examples of the linking group are the same as those for L1 and SP1 described above, and A represents a (meth) acryloyloxy group).

From the viewpoint of a further increase of the alignment degree of the dichroic substance, T1 is preferably an alkoxy group having 1 to 10 carbon atoms, more preferably an alkoxy group having 1 to 5 carbon atoms, and still more preferably a methoxy group.

The terminal groups may be further substituted with the above groups or polymerizable groups described in JP2010-244038A.

T1 is preferably a polymerizable group from the viewpoint of further enhancing the adhesiveness to the adjacent layer and improving the cohesive force of the film.

The polymerizable group is not particularly limited, but is preferably a polymerizable group which is radically polymerizable or cationically polymerizable.

As the radically polymerizable group, generally known radically polymerizable groups can be used, and suitable examples thereof include an acryloyl group and a methacryloyl group. In this case, an acryloyl group is generally known to have a high polymerization rate and therefore the acryloyl group is preferable from the viewpoint of improving productivity. However, a methacryloyl group can also be used as the polymerizable group.

As the cationically polymerizable group, generally known cationically polymerizable groups can be used, and specific examples thereof include an alicyclic ether group, a cyclic acetal group, a cyclic lactone group, a cyclic thioether group, a spiroorthoester group, and a vinyloxy group. Among these, an alicyclic ether group or a vinyloxy group is suitable, and an epoxy group, an oxetanyl group, or a vinyloxy group is preferable.

From the viewpoint of a further increase of the alignment degree of the dichroic substance, the weight-average molecular weight (Mw) of the polymer liquid crystal compound having a repeating unit represented by Formula (1) is 1,000 to 500,000 and more preferably 2,000 to 300,000. In a case where the Mw of the polymer liquid crystal compound is within the above range, the polymer liquid crystal compound is easily handled.

In particular, from the viewpoint of suppressing the occurrence of cracking during coating, the weight-average molecular weight (Mw) of the polymer liquid crystal compound is preferably 10,000 or more, and more preferably 10,000 to 300,000.

In addition, from the viewpoint of temperature latitude of the alignment degree, the weight-average molecular weight (Mw) of the polymer liquid crystal compound is preferably less than 10,000 and more preferably 2,000 or more and less than 10,000.

Here, in the present invention, the weight-average molecular weight and the number-average molecular weight are values measured by gel permeation chromatography (GPC).

Solvent (eluent): N-methylpyrrolidone

Device name: TOSOH HLC-8220GPC

Column: Three columns TOSOH TSKgel Super AWM-H (6 mm×15 cm) are connected and used.

Column temperature: 25° C.

Sample concentration: 0.1% by mass

Flow rate: 0.35 mL/min

Calibration curve: A calibration curve made by 7 samples of TSK standard polystyrene manufactured by TOSOH Corporation, Mw of which is 2,800,000 to 1,050 (Mw/Mn=1.03 to 1.06), is used.

The liquid crystal compound is preferably a liquid crystal compound having reverse wavelength dispersibility.

In the present specification, the expression "having reverse wavelength dispersibility" means that a retardation film produced using the liquid crystal compound satisfies relationships represented by Expression (X1) and (X2).

$$Re(450)/Re(550) < 1 \quad \text{(X1)}$$

$$1 < Re(630)/Re(550) \quad \text{(X2)}$$

The polymerizable liquid crystal compound having reverse wavelength dispersibility is not particularly limited as long as it can form a film having reverse wavelength dispersibility, and examples thereof include a compound represented by General Formula (I) (in particular, compounds described in paragraphs [0034] to [0039]) described in JP2008-297210A, a compound represented by General Formula (1) (in particular, compounds described in paragraphs [0067] to [0073]) described in JP2010-084032A, a compound represented by General Formula (1) (in particular, compounds described in paragraphs [0117] to [0124]) described in JP2019-73496A, and a compound represented by General Formula (1) (in particular, compounds described in paragraphs [0043] to [0055]) described in JP2016-081035A.

The polymerizable liquid crystal compound is preferably a polymerizable liquid crystal compound having a partial structure represented by Formula (II) due to the reason that a change in tint is suppressed.

$$*\text{-}D^1\text{-}Ar\text{-}D^2\text{-}* \quad \text{(II)}$$

In Formula (II), $D^1$ and $D^2$ each independently represent a single bond, —O—, —CO—, —CO—O—, —C(═S)O—, —$CR^1R^2$—, —$CR^1R^2$—$CR^3R^4$—, —O—$CR^1R^2$—, —$CR^1R^2$—O—$CR^3R^4$—, —CO—O—$CR^1R^2$—, —O—CO—$CR^1R^2$—, —$CR^1R^2$—$CR^3R^4$—O—CO—, —$CR^1R^2$—O—CO—$CR^3R^4$—, —$CR^1R^2$—CO—O—$CR^3R^4$—, —NR1_$CR^2R^3$—, or —CO—$NR^1$—.

$R^1$, $R^2$, $R^3$, and $R^4$ each independently represent a hydrogen atom, a fluorine atom, or an alkyl group having 1 to 4 carbon atoms. In a case where there are a plurality of each of $R^1$'s, $R^2$'s, $R^3$'s, and $R^4$'s, the plurality of $R^1$'s, the plurality of $R^2$'s, the plurality of $R^3$'s, and the plurality of $R^4$'s each may be the same or different from each other.

Ar represents any aromatic ring selected from the group consisting of groups represented by Formulae (Ar-1) to (Ar-7). In Formulae (Ar-1) to (Ar-7), * represents a bonding position to $D^1$ or $D^2$, and descriptions of reference numerals in Formulae (Ar-1) to (Ar-7) are the same as those described by Ar in Formula (III), which will be described later.

(Ar-1)

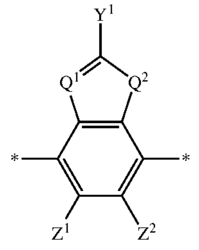

(Ar-2)

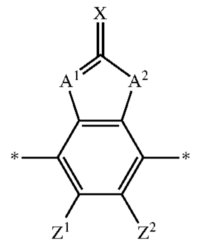

-continued (Ar-3)

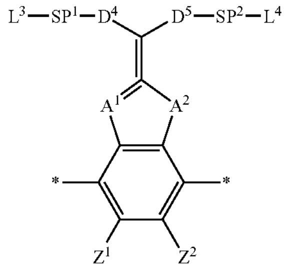

(Ar-4)

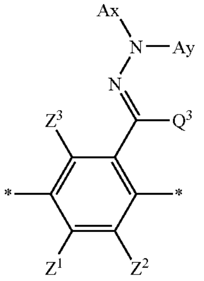

(Ar-5)

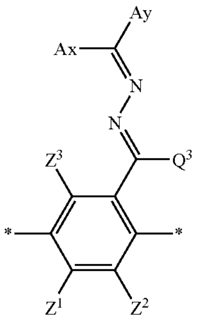

(Ar-6)

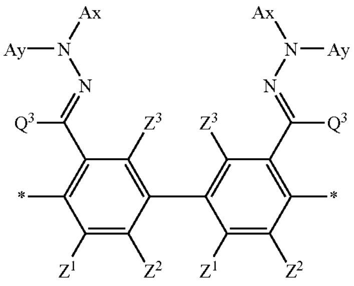

(Ar-7)

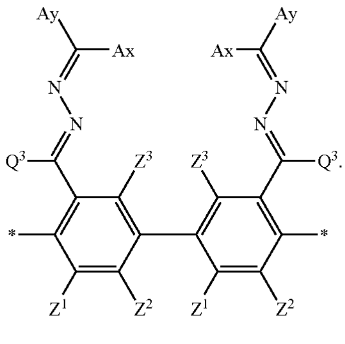

The polymerizable liquid crystal compound having a partial structure represented by Formula (II) is preferably a polymerizable liquid crystal compound represented by Formula (III).

The polymerizable liquid crystal compound represented by Formula (III) is a compound exhibiting liquid crystallinity.

$$L^1\text{-}G^1\text{-}D^1\text{-}Ar\text{-}D^2\text{-}G^2\text{-}L^2 \quad (III)$$

In Formula (III), $D^1$ and $D^2$ each independently represent a single bond, —O—, —CO—, —CO—O—, —C(=S)O—, —$CR^1R^2$—, —$CR^1R^2$—$CR^3R^4$—, —O—$CR^1R^2$—, —$CR^1R^2$—O—$CR^3R^4$—, —CO—O—$CR^1R^2$—, —O—CO—$CR^1R^2$—, —$CR^1R^2$—$CR^3R^4$—O—CO—, —$CR^1R^2$—O—CO—$CR^3R^4$—, —$CR^1R^2$—CO—O—$CR^3R^4$—, —$NR^1$—$CR^2R^3$—, or —CO—$NR^1$—.

$R^1$, $R^2$, $R^3$, and $R^4$ each independently represent a hydrogen atom, a fluorine atom, or an alkyl group having 1 to 4 carbon atoms. In a case where there are a plurality of each of $R^1$'s, $R^2$'s, $R^3$'s, and $R^4$'s, the plurality of $R^1$'s, the plurality of $R^2$'s, the plurality of $R^3$'s, and the plurality of $R^4$'s each may be the same or different from each other.

$G^1$ and $G^2$ each independently represent a divalent alicyclic hydrocarbon group or an aromatic hydrocarbon group having 5 to 8 carbon atoms, and a methylene group included in the alicyclic hydrocarbon group may be substituted with —O—, —S—, or —NH—.

$L^1$ and $L^2$ each independently represent a monovalent organic group, and at least one selected from the group consisting of $L^1$ and $L^2$ represents a monovalent group having a polymerizable group.

Ar represents any aromatic ring selected from the group consisting of groups represented by Formulae (Ar-1) to (Ar-7). In Formulae (Ar-1) to (Ar-7), *represents a bonding position to $D^1$ or $D^2$.

(Ar-1)

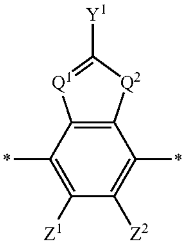

(Ar-2)

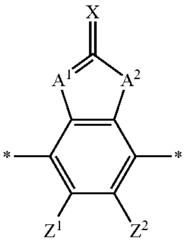

(Ar-3)

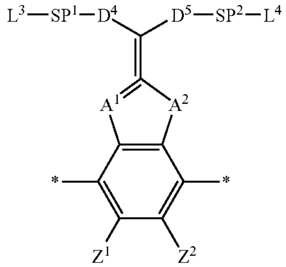

-continued (Ar-4)

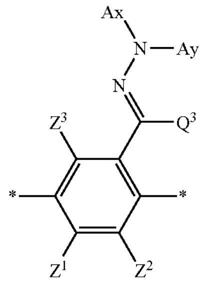

(Ar-5)

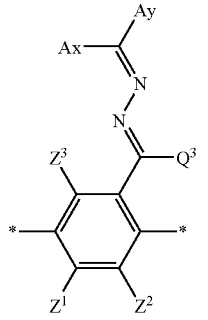

(Ar-6)

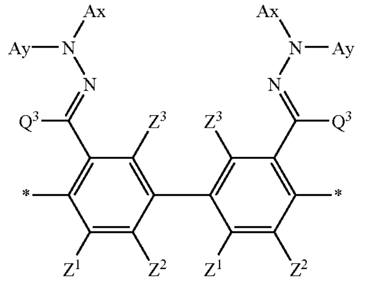

(Ar-7)

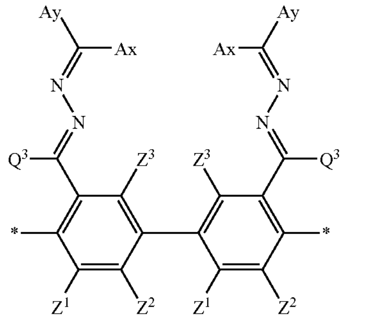

In Formula (Ar-1), $Q^1$ represents N or CH, $Q^2$ represents 13 S—, —O—, or —N ($R^7$)—, $R^7$ represents a hydrogen atom or an alkyl group having 1 to 6 carbon atoms, and $Y^1$ represents an aromatic hydrocarbon group having 6 to 12 carbon atoms or an aromatic heterocyclic group having 3 to 12 carbon atoms, each of which may have a substituent.

Examples of the alkyl group having 1 to 6 carbon atoms, represented by $R^7$, include a methyl group, an ethyl group, a propyl group, an isopropyl group, an n-butyl group, an isobutyl group, a sec-butyl group, a tert-butyl group, an n-pentyl group, and an n-hexyl group.

Examples of the aromatic hydrocarbon group having 6 to 12 carbon atoms, represented by $Y^1$, include aryl groups such as a phenyl group, a 2,6-diethylphenyl group, and a naphthyl group.

Examples of the aromatic heterocyclic group having 3 to 12 carbon atoms, represented by $Y^1$, include heteroaryl groups such as a thienyl group, a thiazolyl group, a furyl group, and a pyridyl group.

In addition, examples of the substituent which may be included in $Y^1$ include an alkyl group, an alkoxy group, an alkylcarbonyl group, an alkoxycarbonyl group, an alkylcarbonyloxy group, an alkylamino group, a dialkylamino group, an alkylamide group, an alkenyl group, an alkynyl group, a halogen atom, a cyano group, a nitro group, an alkylthiol group, and an N-alkylcarbamate group, and among these, an alkyl group, an alkoxy group, an alkoxycarbonyl group, an alkylcarbonyloxy group, or a halogen atom is preferable.

As the alkyl group, a linear, branched, or cyclic alkyl group having 1 to 18 carbon atoms is preferable, an alkyl group having 1 to 8 carbon atoms (for example, a methyl group, an ethyl group, a propyl group, an isopropyl group, an n-butyl group, an isobutyl group, a sec-butyl group, a t-butyl group, and a cyclohexyl group) is more preferable, an alkyl group having 1 to 4 carbon atoms is still more preferable, and a methyl group or an ethyl group is particularly preferable.

As the alkoxy group, an alkoxy group having 1 to 18 carbon atoms is preferable, an alkoxy group having 1 to 8 carbon atoms (for example, a methoxy group, an ethoxy group, an n-butoxy group, and a methoxyethoxy group) is more preferable, an alkoxy group having 1 to 4 carbon atoms is still more preferable, and a methoxy group or an ethoxy group is particularly preferable.

Examples of the alkoxycarbonyl group include groups in which an oxycarbonyl group (—O—CO— group) is bonded to the alkyl group exemplified above, and among these, a methoxycarbonyl group, an ethoxycarbonyl group, an n-propoxycarbonyl group, or an isopropoxycarbonyl group is preferable, and a methoxycarbonyl group is more preferable.

Examples of the alkylcarbonyloxy group include groups in which a carbonyloxy group (—CO—O— group) is bonded to the alkyl group exemplified above, and among these, a methylcarbonyloxy group, an ethylcarbonyloxy group, an n-propylcarbonyloxy group, or an isopropylcarbonyloxy group is preferable, and a methylcarbonyloxy group is more preferable.

Examples of the halogen atom include a fluorine atom, a chlorine atom, a bromine atom, and an iodine atom. Among these, a fluorine atom or a chlorine atom is preferable.

In addition, in Formulae (Ar-1) to (Ar-7), $Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a halogen atom, a cyano group, a nitro group, —$OR^8$, —$NR^9R^{10}$, or —$SR^{11}$, in which $R^8$ to $R^{11}$ each independently represent a hydrogen atom or and an alkyl group having 1 to 6 carbon atoms and $Z^1$ and $Z^2$ may be bonded to each other to form an aromatic ring.

The monovalent aliphatic hydrocarbon group having 1 to 20 carbon atoms is preferably an alkyl group having 1 to 15 carbon atoms, more preferably an alkyl group having 1 to 8 carbon atoms, still more preferably a methyl group, an ethyl group, an isopropyl group, a tert-pentyl group (1,1-dimethylpropyl group), a tert-butyl group, or a 1,1-dimethyl-3,3-dimethyl-butyl group, and particularly preferably a methyl group, an ethyl group, or a tert-butyl group.

Examples of the monovalent alicyclic hydrocarbon group having 3 to 20 carbon atoms include monocyclic saturated hydrocarbon groups such as a cyclopropyl group, a cyclobutyl group, a cyclopentyl group, a cyclohexyl group, a cycloheptyl group, a cyclooctyl group, a cyclodecyl group, a methylcyclohexyl group, and an ethylcyclohexyl group; monocyclic unsaturated hydrocarbon groups such as a cyclobutenyl group, a cyclopentenyl group, a cyclohexenyl group, a cycloheptenyl group, a cyclooctenyl group, a cyclodecenyl group, a cyclopentadienyl group, a cyclohexadienyl group, a cyclooctadienyl group, and a cyclodecadiene; and polycyclic saturated hydrocarbon groups such as a bicyclo [2.2.1]heptyl group, a bicyclo[2.2.2]octyl group, a tricyclo $[5.2.1.0^{2,6}]$decyl group, a tricyclo$[3.3.1.1^{3,7}]$decyl group, a tetracyclo $[6.2.1.1^{3,6}.0^{2,7}]$dodecyl group, and an adamantyl group.

Examples of the monovalent aromatic hydrocarbon group having 6 to 20 carbon atoms include a phenyl group, a 2,6-diethylphenyl group, a naphthyl group, and a biphenyl group, and an aryl group having 6 to 12 carbon atoms (particularly, a phenyl group) is preferable.

Examples of the halogen atom include a fluorine atom, a chlorine atom, a bromine atom, and an iodine atom, and among these, a fluorine atom, a chlorine atom, or a bromine atom is preferable.

Examples of the alkyl group having 1 to 6 carbon atoms, represented by $R^8$ to $R^{11}$, include a methyl group, an ethyl group, a propyl group, an isopropyl group, an n-butyl group, an isobutyl group, a sec-butyl group, a tert-butyl group, an n-pentyl group, and an n-hexyl group.

In addition, in Formulae (Ar-2) and (Ar-3), $A^1$ and $A^2$ each independently represent a group selected from the group consisting of —O—, —N $(R^{12})$—, —S—, and —CO—, and $R^{12}$ represents a hydrogen atom or a substituent.

Examples of the substituent represented by $R^{12}$ include the same ones as the substituents which may be included in $Y^1$ in Formula (Ar-1).

In addition, in Formula (Ar-2), X represents a hydrogen atom or a non-metal atom of Groups XIV to XVI, to which a substituent may be bonded.

In addition, examples of the non-metal atom of Groups XIV to XVI represented by X include an oxygen atom, a sulfur atom, a nitrogen atom to which a hydrogen atom or a substituent is bonded [$=N-R^{N1}$, $R^{N1}$ represents a hydrogen atom or a substituent], and a carbon atom to which a hydrogen atom or a substituent is bonded [$=C-(R^{C1})_2$, $R^{C1}$ represents a hydrogen atom or a substituent].

Examples of the substituent include an alkyl group, an alkoxy group, an alkyl-substituted alkoxy group, a cyclic alkyl group, an aryl group (for example, a phenyl group, and a naphthyl group), a cyano group, an amino group, a nitro group, an alkylcarbonyl group, a sulfo group, and a hydroxyl group.

In addition, in Formula (Ar-3), $D^4$ and $D^5$ each independently represent a single bond, —CO—, —O—, —S—, —C(=S)—, $-CR^{1a}R^{2a}-$, $-CR^{3a}=CR^{4a}-$, $-NR^{5a}-$, or a divalent linking group consisting of a combination of two or more thereof, and $R^{1a}$ to $R^{5a}$ each independently represent a hydrogen atom, a fluorine atom, or an alkyl group having 1 to 4 carbon atoms.

Here, examples of the divalent linking group include —CO—, —O—, —CO—O—, —C (=S) O—, $-CR^{1b}R^{2b}-$, $-CR^{1b}R^{2b}-CR^{1b}R^{2b}-$, $-O-CR^{1b}R^{2b}-$, $-CR^{1b}R^{2b}-O-CR^{1b}R^{2b}-$, $-CO-O-CR^{1b}R^{2b}-$, $-O-CO-CR^{1b}R^{2b}-$, $-CR^{1b}R^{2b}-O-CO-CR^{1b}R^{2b}-$, $-CR^{1b}R^{2b}-CO-O-CR^{1b}R^{2b}-$, $-NR^{3b}-CR^{1b}R^{2b}-$, and $-CO-NR^{3b}-$. $R^{1b}$, $R^{2b}$, and $R^{3b}$ each independently represent a hydrogen atom, a fluorine atom, or an alkyl group having 1 to 4 carbon atoms.

In addition, in Formula (Ar-3), $SP^1$ and $SP^2$ each independently represent a single bond, a linear or branched alkylene group having 1 to 12 carbon atoms, or a divalent linking group in which one or more $-CH_2-$'s constituting a linear or branched alkylene group having 1 to 12 carbon atoms are substituted with —O—, —S—, —NH—, —N(Q)—, or —CO—, in which Q represents a substituent. Examples of the substituent include the same ones as the substituents which may be included in $Y^1$ in Formula (Ar-1).

Here, the linear or branched alkylene group having 1 to 12 carbon atoms is preferably, for example, a methylene group, an ethylene group, a propylene group, a butylene group, a pentylene group, a hexylene group, a methylhexylene group, or a heptylene group.

In addition, in Formula (Ar-3), $L^3$ and $L^4$ each independently represent a monovalent organic group.

Examples of the monovalent organic group include an alkyl group, an aryl group, and a heteroaryl group. The alkyl group may be linear, branched, or cyclic, but is preferably linear. The number of carbon atoms in the alkyl group is preferably 1 to 30, more preferably 1 to 20, and still more preferably 1 to 10. In addition, the aryl group may be monocyclic or polycyclic, but is preferably monocyclic. The number of carbon atoms in the aryl group is preferably 6 to 25, and more preferably 6 to 10. In addition, the heteroaryl group may be monocyclic or polycyclic. The number of heteroatoms constituting the heteroaryl group is preferably 1 to 3. The heteroatom constituting the heteroaryl group is preferably a nitrogen atom, a sulfur atom, or an oxygen atom. The number of carbon atoms in the heteroaryl group is preferably 6 to 18,and more preferably 6 to 12. In addition, the alkyl group, the aryl group, and the heteroaryl group may be unsubstituted or have a substituent. Examples of the substituent include the same ones as the substituents which may be included in $Y^1$ in Formula (Ar-1).

In addition, in Formulae (Ar-4) to (Ar-7), Ax represents an organic group having 2 to 30 carbon atoms, which has at least one aromatic ring selected from the group consisting of an aromatic hydrocarbon ring and an aromatic heterocyclic ring.

In addition, in Formulae (Ar-4) to (Ar-7), Ay represents a hydrogen atom, an alkyl group having 1 to 12 carbon atoms, which may have a substituent, or an organic group having 2 to 30 carbon atoms which has at least one aromatic ring selected from the group consisting of an aromatic hydrocarbon ring and an aromatic heterocyclic ring.

Here, the aromatic rings in Ax and Ay may have a substituent, and Ax and Ay may be bonded to each other to form a ring.

In addition, $Q^3$ represents a hydrogen atom or an alkyl group having 1 to 6 carbon atoms, which may have a substituent.

Examples of Ax and Ay include those described in paragraphs [0039] to [0095] of WO2014/010325A.

In addition, examples of the alkyl group having 1 to 6 carbon atoms represented by $Q^3$ include a methyl group, an ethyl group, a propyl group, an isopropyl group, an n-butyl group, an isobutyl group, a sec-butyl group, a tert-butyl group, an n-pentyl group, and an n-hexyl group, and examples of the substituent include the same ones as the substituents which may be included in $Y^1$ in Formula (Ar-1).

With regard to the definition and preferable range of each substituent of the liquid crystal compound represented by Formula (III), the descriptions regarding $D^1$, $D^2$, $G^1$, $G^2$, $L^1$, $L^2$, $R^4$, $R^5$, $R^6$, $R^7$, $X^1$, $Y^1$, $Q^1$, and $Q^2$ for the compound (A) described in JP2012-021068A can be referred to for $D_1$, $D_2$, $G_1$, $G_2$, $L_1$, $L_2$, $R_1$, $R_2$, $R_3$, $R_4Q_1Y_1$, $Z_1$, and $Z_2$, respectively; the descriptions regarding $A_1$, $A_2$, and X for the compound represented by General Formula (I) described in JP2008-107767A can be referred to for $A_1$, $A_2$, and X, respectively; and the descriptions regarding Ax, Ay, and $Q^1$ for the compound represented by General Formula (I) described in WO 2013/018526A can be referred to for $A_1$, $A_2$, and $Q_2$, respectively. Reference can be made to the description on $Q^1$ for the compound (A) described in JP2012-21068A with regard to $Z_3$.

In particular, the organic groups represented by $L^1$ and $L^2$ are each preferably a group represented by $-D^3-G^3-Sp-P^3$.

$D^3$ has the same definition as in $D^1$.

$G^3$ represents a single bond, a divalent aromatic ring group or heterocyclic group having 6 to 12 carbon atoms, or a divalent alicyclic hydrocarbon group having 5 to 8 carbon atoms, and a methylene group included in the alicyclic hydrocarbon group may be substituted with —O—, —S—, or $NR^7$—, in which $R^7$ represents a hydrogen atom or an alkyl group having 1 to 6 carbon atoms.

Sp represents a single bond or a spacer group represented by $-(CH_2)_n-$, $-(CH_2)_n-O-$, $-(CH_2-O-)_n-$, $-(CH_2CH_2-O-)_m$, $-O-(CH_2)_n-$, $-O-(CH_2)_n-O-$, $-O-(CH_2-O-)_n-$, $-O-(CH_2CH_2-O-)_m$, $-C(=O)-O-(CH_2)_n-$, $-C(=O)-O-(CH_2)_n-O-$, $-C(=O)-O-(CH_2-O-)_n-$, $-C(=O)-O-(CH_2CH_2-O-)_m$, $-C(=O)-N(R^8)-(CH_2)_n-$, $-C(=O)-N(R^8)-(CH_2)_n-O-$, $-C(=O)-N(R^8)-(CH_2-O-)_n-$, $-C(=O)-(R^8)-(CH_2CH_2-O-)_m$, or $(CH_2)_m-O-(C=O)-(CH_2)_n-C(=O)-O-(CH_2)_n-$. Here, n represents an integer of 2 to 12, m represents an integer of 2 to 6, and $R^8$ represents a hydrogen atom or an alkyl group having 1 to 6 carbon atoms. In addition, a hydrogen atom of $-CH_2-$ in each group described above may be substituted with a methyl group.

$P^3$ represents a polymerizable group.

The polymerizable group is not particularly limited, but is preferably a polymerizable group capable of radical polymerization or cationic polymerization.

Examples of the radically polymerizable group include known radically polymerizable groups, and an acryloyl group or a methacryloyl group is preferable. It has been known that an acryloyl group generally has a high polymerization rate, and from the viewpoint of improving productivity, an acryloyl group is preferable. However, a methacryloyl group can also be used as the polymerizable group for highly birefringent liquid crystals.

Examples of the cationically polymerizable group include known cationically polymerizable groups, and examples thereof include an alicyclic ether group, a cyclic acetal group, a cyclic lactone group, a cyclic thioether group, a spiroorthoester group, and a vinyloxy group. Among these, an alicyclic ether group or a vinyloxy group is preferable, and an epoxy group, an oxetanyl group, or a vinyloxy group is more preferable.

Particularly preferable examples of the polymerizable group include a polymerizable group represented by any of Formulae (P-1) to (P-20).

(P-1)

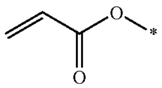

-continued (P-2)

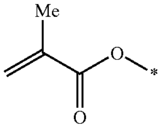

(P-3)

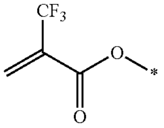

(P-4)

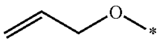

(P-5)

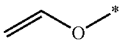

(P-6)

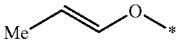

(P-7)

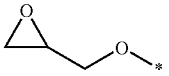

(P-8)

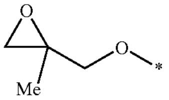

(P-9)

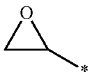

(P-10)

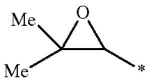

(P-11)

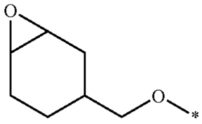

(P-12)

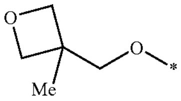

(P-13)

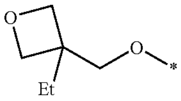

(P-14)

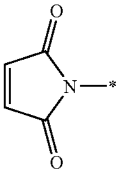

(P-15)

HS—*

(P-16)

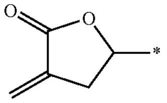

-continued (P-17)

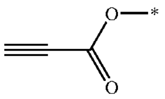

(P-18)

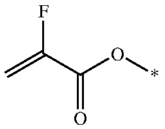

(P-19)

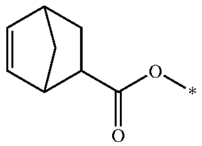

(P-20)

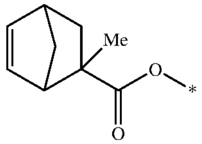

In addition, examples of other preferable aspects of the liquid crystal compound include a compound represented by Formula (V).

$$L^1\text{-}[D^1\text{-}G^1]_m\text{-}E^1\text{-}A\text{-}E^2\text{-}[G^2\text{-}D^2]_n\text{-}L^2 \qquad (V)$$

In Formula (V),

A represents a non-aromatic carbocyclic group or heterocyclic group having 5 to 8 carbon atoms, or an aromatic group or heteroaromatic group having 6 to 20 carbon atoms;

$E^1$, $E^2$, $D^1$ , and $D^2$ each independently represent a single bond or a divalent linking group;

$L^1$ and $L^2$ each independently represen —H, —F, —Cl, —Br, —I, —CN, —NC, —NCO, —OCN, —SCN, —C(═O)NR$^1$R$^2$, —C(═O)R$^1$, —O—C(═O)R$^1$, —NH$_2$, —SH, —SR$^1$, —SO$_3$H, —SO$_2$R$^1$, —OH, —NO$_2$, —CF$_3$, —SF$_3$, substituted or unsubstituted silyl, a substituted or unsubstituted carbyl group or hydrocarbyl group having 1 to 40 carbon atoms, or-Sp-P, in which at least one of $L^1$ or $L^2$ is -Sp-P, P is a polymerizable group, Sp is a spacer group or a single bond, and $R^1$ and $R^2$ each independently represent —H or alkyl having 1 to 12 carbon atoms;

m and n each independently represent an integer of 1 to 5; in a case where m or n is 2 or more, the repeating units -($D^1$-$G^1$)- or -($G^2$-$D^2$ )- repeated two or more times may be the same or different from each other; and $G^1$ and $G^2$ each independently represent a non-aromatic carbocyclic group or heterocyclic group having 5 to 8 carbon atoms or an aromatic group or heteroaromatic group having 6 to 20 carbon atoms, in which at least one of $G^1$ or $G^2$ is the carbocyclic group or the heterocyclic group, and any one hydrogen atom included in the carbocyclic group or the heterocyclic group is substituted with a group represented by Formula (VI):

$$*\text{-}[Q^1]_p\text{-}B^1 \qquad (VI)$$

In Formula (VI), in a case where p is an integer of 1 to 10 and p is 2 or more, the repeating units -($Q^1$)- repeated two or more times may be the same or different from each other, $Q^1$'s each independently represent a divalent group selected from the group consisting of —C≡C—, —CY$^1$═CY$^2$—, and substituted or unsubstituted aromatic groups or heteroaromatic groups having 6 to 20 carbon atoms, $Y^1$ and $Y^2$ each independently represent —H, —F, —Cl, —CN, or —R$^1$, $B^1$ is —H, —F, —Cl, —Br, —I, —CN, —NC, —NCO, —OCN, —SCN, —C(═O)NR$^1$R$^2$, —C(═O) R$^1$, —NH$^2$, —SH, —SR$^1$, —SO$_3$H, —SO$_2$R$_1$, —OH, —NO$_2$, —CF$_3$, —SF$_3$, a polymerizable group, an alkenyl group having 2 to 6 carbon atoms, an alkynyl group having 2 to 6 carbon atoms, an acyl group having 2 to 4 carbon atoms, an alkynylene group having 2 to 6 carbon atoms with an acyl group having 2 to 4 carbon atoms bonded to a terminal, an alcohol group having 1 to 5 carbon atoms, or an alkoxy group having 1 to 12 carbon atoms, and $R^1$ and $R^2$ each independently represent —H or alkyl having 1 to 12 carbon atoms.

The liquid crystal compound may have forward wavelength dispersibility.

In the present specification, the expression "have forward wavelength dispersibility" means that a retardation film produced using this liquid crystal compound satisfies relationships represented by Expression (Y1) and (Y2).

$$Re(450)/Re(550) > 1 \qquad (Y1)$$

$$1 > Re(630)/Re(550) \qquad (Y2)$$

The liquid crystal compound is also preferably a polymerizable liquid crystal compound which has forward wavelength dispersibility and has two polymerizable groups $P^1$ and $P^2$ and three or more rings $B^1$ selected from the group consisting of an aromatic ring and an alicyclic ring and existing on a bond connecting the polymerizable groups $P^1$ and $P^2$.

The two polymerizable groups $P^1$ and $P^2$ included in the polymerizable liquid crystal compound may be the same or different from each other, and the three or more rings $B^1$ included in the polymerizable liquid crystal compound may be the same or different from each other.

The polymerizable groups $P^1$ and $P^2$ included in the polymerizable liquid crystal compound are not particularly limited, but are preferably polymerizable groups capable of radical polymerization or cationic polymerization.

A known radically polymerizable group can be used as the radically polymerizable group, and suitable examples thereof include an acryloyloxy group and a methacryloyloxy group. In this case, it has been known that an acryloyloxy group tends to have a higher polymerization rate, and from the viewpoint of improving productivity, an acryloyloxy group is preferable. However, a methacryloyloxy group can also be used as the polymerizable group.

A known cationically polymerizable group can be used as the cationically polymerizable group, and specific examples thereof include an alicyclic ether group, a cyclic acetal group, a cyclic lactone group, a cyclic thioether group, a spiroorthoester group, and a vinyloxy group. Among these, an alicyclic ether group or a vinyloxy group is preferable, and an epoxy group, an oxetanyl group, or a vinyloxy group is more preferable.

Particularly preferable examples of the polymerizable group include a polymerizable group represented by any of Formulae (P-1) to (P-20).

The polymerizable liquid crystal compound may have three or more polymerizable groups. In a case where the polymerizable liquid crystal compound has three or more polymerizable groups, a polymerizable group other than the polymerizable groups $P^1$ and $P^2$ described above is not particularly limited, and examples thereof include the same ones as the radically polymerizable or cationically polymerizable groups described above, including suitable aspects thereof.

The number of polymerizable groups included in the polymerizable liquid crystal compound is preferably 2 to 4, and it is more preferable to have only two of the polymerizable groups $P^1$ and $P^2$.

The polymerizable liquid crystal compound has three or more rings $B^1$ selected from the group consisting of an aromatic ring which may have a substituent and an alicyclic ring which may have a substituent, the ring $B^1$ existing on a bond connecting the polymerizable groups $P^1$ and $P^2$.

Here, the description that the ring $B^1$ "existing on a bond connecting the polymerizable groups $P^1$ and $P^2$" means that the ring $B^1$ constitutes a part of the portion required for directly linking the polymerizable groups $P^1$ and $P^2$.

The polymerizable liquid crystal compound may have a portion other than the portion required for directly linking the polymerizable groups $P^1$ and $P^2$ (hereinafter, also described as "side chain"), and a ring structure forming a part of the side chain is not included in the ring $B^1$.

Examples of the aromatic ring which may have a substituent, which is one aspect of the ring $B^1$, include an aromatic ring having 5 to 20 ring members, which may have a substituent.

Examples of the aromatic ring having 5 to 20 ring members include aromatic hydrocarbon rings such as a benzene ring, a naphthalene ring, an anthracene ring, and a phenanthrene ring; and aromatic heterocyclic rings such as a furan ring, a pyrrole ring, a thiophene ring, a pyridine ring, a thiazole ring, a benzothiazole ring, a quinoline ring, an isoquinoline ring, a quinoxaline ring, and a quinazoline ring.

Examples of the substituent which may be included in the aromatic ring which is one aspect of the ring $B^1$ include an alkyl group, an alkoxy group, an alkylcarbonyl group, an alkoxycarbonyl group, an alkylcarbonyloxy group, an alkylamino group, a dialkylamino group, an alkylamide group, an alkenyl group, an alkynyl group, a halogen atom, a cyano group, a nitro group, an alkylthiol group, and an N-alkyl carbamate group.

Among these, an alkyl group, an alkoxy group, an alkoxycarbonyl group, an alkylcarbonyloxy group, or a halogen atom is preferable.

The alkyl group is preferably a linear, branched, or cyclic alkyl group having 1 to 18 carbon atoms, more preferably an alkyl group having 1 to 8 carbon atoms (for example, a methyl group, an ethyl group, a propyl group, an isopropyl group, an n-butyl group, an isobutyl group, a sec-butyl group, a t-butyl group, and a cyclohexyl group), still more preferably an alkyl group having 1 to 4 carbon atoms, and particularly preferably a methyl group or an ethyl group.

The alkoxy group is preferably an alkoxy group having 1 to 18 carbon atoms, more preferably an alkoxy group having 1 to 8 carbon atoms (for example, a methoxy group, an ethoxy group, an n-butoxy group, and a methoxyethoxy group), still more preferably an alkoxy group having 1 to 4 carbon atoms, and particularly preferably a methoxy group or an ethoxy group.

Examples of the alkoxycarbonyl group include a group in which an oxycarbonyl group (—O—CO— group) is bonded to the alkyl group exemplified above. A methoxycarbonyl group, an ethoxycarbonyl group, an n-propoxycarbonyl group, or an isopropoxycarbonyl group is preferable, and a methoxycarbonyl group is more preferable.

Examples of the alkylcarbonyloxy group include a group in which a carbonyloxy group (—CO—O— group) is bonded to the alkyl group exemplified above. A methylcarbonyloxy group, an ethylcarbonyloxy group, an n-propylcarbonyloxy group, or an isopropylcarbonyloxy group is preferable, and a methylcarbonyloxy group is more preferable.

Examples of the halogen atom include a fluorine atom, a chlorine atom, a bromine atom, and an iodine atom, and a fluorine atom or a chlorine atom is preferable.

Examples of the alicyclic ring which may have a substituent, which is one aspect of the ring $B^1$, include a divalent alicyclic hydrocarbon group having 5 to 20 carbon atoms, which may have a substituent, and a heterocyclic ring in which one or more $—CH_2—$'s constituting an alicyclic hydrocarbon group having 5 to 20 carbon atoms are substituted with —O—, —S—, or —NH—.

The divalent alicyclic hydrocarbon group having 5 to 20 carbon atoms is preferably a 5-membered ring or a 6-membered ring. In addition, the alicyclic hydrocarbon group may be saturated or unsaturated, but a saturated alicyclic hydrocarbon group is preferable. As the divalent alicyclic hydrocarbon group, for example, the description of paragraph of [0078] of JP2012-021068A can be referred to, the contents of which are incorporated herein by reference.

The alicyclic ring which is one aspect of the ring $B^1$ is preferably a cycloalkane ring having 5 to 20 carbon atoms. Examples of the cycloalkane ring having 5 to 20 carbon atoms include a cyclohexane ring, a cyclopeptane ring, a cyclooctane ring, a cyclododecane ring, and a cyclodocosane ring. Among these, a cyclohexane ring is preferable, a 1,4-cyclohexylene group is more preferable, and a trans-1,4-cyclohexylene group is still more preferable.

Examples of the substituent which may be included in the alicyclic ring which is one aspect of the ring $B^1$ include the same ones as the substituents which may be included in the aromatic ring which is one aspect of the ring $B^1$ described above, including suitable aspects thereof.

The alicyclic ring which is one aspect of the ring $B^1$ preferably has no substituent.

As the ring $B^1$, the polymerizable liquid crystal compound preferably has at least one aromatic ring which may have a substituent, and more preferably has at least one group represented by Formula (III) described later.

In addition, as the ring $B^1$, the polymerizable liquid crystal compound preferably has at least one cyclohexane ring, more preferably has at least one 1,4-cyclohexylene group, and still more preferably has at least one trans-1,4-cyclohexylene group.

That is, as the ring $B^1$, the polymerizable liquid crystal compound preferably has a combination consisting of at least one aromatic ring (more preferably, the group represented by Formula (III) described later) and at least one cyclohexane ring (more preferably, two to four 1,4-cyclohexylene groups).

In the polymerizable liquid crystal compound, the number of rings $B^1$ existing on the bond connecting the polymerizable groups $P^1$ and $P^2$ is not particularly limited, but from the viewpoint of alignment stability of the liquid crystal compound, the number thereof is preferably 3 to 7, more preferably 4 to 6, and still more preferably 5.

From the reason that optical compensation properties are further improved, the polymerizable liquid crystal compound is preferably a compound represented by Formula (I).

$$P^1-Sp^1-(X^1-Ar^1)_{n1}-(X^2-Cy^1)_{m1}-X^3-Ar^3-X^4-(Cy^2-X^5)_{m2}-(Ar^2-X^6)_{n2}Sp^2-P^2 \quad (I)$$

In Formula (I), $P^1$ and $P^2$ each independently represent a polymerizable group.

$Sp^1$ and $Sp^2$ each independently represent a single bond, a linear or branched alkylene group having 1 to 14 carbon atoms, or a divalent linking group in which one or more —$CH_2$—'s constituting a linear or branched alkylene group having 1 to 14 carbon atoms are substituted with —O—, —S—, —NH—, —N(Q)-, or —CO—, in which Q represents a substituent.

n1, m1, m2, and n2 represent an integer of 0 to 4, and the total of n1, m1, m2, and n2 is 4.

$X^1$, $X^2$, $X^3$, $X^4X^5$, and $X^6$ each independently represent a single bond, —CO—, —O—, —S—, —C(═S)—, —$CR^1R^2$—, —$CR^3$═$CR^4$—, —$NR^5$—, or a divalent linking group consisting of a combination of two or more thereof, and $R^1$ to $R^5$ each independently represent a hydrogen atom, a fluorine atom, or an alkyl group having 1 to 12 carbon atoms. However, in a case where n1, m1, m2, or n2 is an integer of 2 to 4, a plurality of $X^1$'s, a plurality of $X^2$'s, a plurality of $X^5$'s, or a plurality of $X^6$'s may be the same or different from each other.

$Ar^1$, $Ar^2$, and $Ar^3$ each independently represent an aromatic ring which may have a substituent. However, in a case where n1 or n2 is an integer of 2 to 4, a plurality of $Ar^1$'s or a plurality of $Ar^2$'s may be the same or different from each other.

$Cy^1$ and $Cy^2$ each independently represent an alicyclic ring which may have a substituent. However, in a case where m1 or m2 is an integer of 2 to 4, a plurality of Cyl's or a plurality of $Cy^2$'s may be the same or different from each other.

In Formula (I), examples of the polymerizable group represented by $P^1$ and $P^2$ include the same ones as the polymerizable groups capable of radical polymerization or cationic polymerization described above. Among these, the polymerizable group represented by any of Formulae (P-1) to (P-20) is preferable, and an acryloyloxy group or a methacryloyloxy group is more preferable.

Examples of the linear or branched alkylene group having 1 to 14 carbon atoms represented by one aspect of $SP^1$ and $SP^2$ in Formula (I) include a methylene group, an ethylene group, a propylene group, a butylene group, a pentylene group, a hexylene group, a methylhexylene group, and a heptylene group. As described above, $Sp^1$ and $Sp^2$ may be a divalent linking group in which one or more —$CH_2$—'s constituting these alkylene groups are substituted with —O—, —S—, —NH—, —N(Q)-, or —CO—.

Examples of the substituent represented by Q include the same ones as the substituents which may be included in the aromatic ring which is one aspect of the ring $B^1$ described above, including suitable aspects thereof.

As $Sp^1$ and $Sp^2$, a linear or branched alkylene group having 1 to 14 carbon atoms (more preferably having 2 to 10 carbon atoms) or a divalent linking group in which one or more —$CH_2$—'s constituting a linear or branched alkylene group having 2 to 14 carbon atoms (more preferably having 4 to 12 carbon atoms) are substituted with —O—or—CO— is preferable.

In Formula (I), the total of n1 and m1 and the total of m2 and n2 are preferably an integer of 1 to 3, and more preferably 2.

From the viewpoint of improving the aligning properties of the polymerizable liquid crystal compound, it is preferable that n1, m1, m2, and n2 be all 1, and from the viewpoint of improving durability, it is preferable that n1 and n2 be all 0 and ml and m2 be all 2.

In Formula (I), examples of the divalent linking group represented by $X^1$, $X^2$, $X^3$, $X^4$, $X^5$, and $X^6$ include —CO—, —O—, —CO—O—, —C(═S)O—, —$CR^1R^2$—, —$CR^1R^2$—$CR^1R^2$—, —O—$CR^1R^2$—, —$CR^1R^2$—O—$CR^1R^2$—, —CO—O—$CR^1R^2$—, —O—CO—$CR^1R^2$—, —$CR^1R^2$—O—CO—$CR^1R^2$—, —$CR^1R^2$—CO—O—$CR^1R^2$—, —$NR^5$—$CR^1R^2$—, and —CO—$NR^5$—. $R^1$, $R^2$, and $R^5$ each independently represent a hydrogen atom, a fluorine atom, or an alkyl group having 1 to 12 carbon atoms.

$X^1$, $X^2$, $X^3$, $X^4$, $X^5$, and $X^6$ are preferably a single bond, —CO—, —O—, or —COO—.

In Formula (I), examples of the aromatic ring which may have a substituent, represented by $Ar^1$, $Ar^2$, and $Ar^3$, include the same ones as the aromatic rings which may have a substituent, which are one aspect of the ring $B^1$ described above.

As Ar3 in Formula (I), from the viewpoint of improving the aligning properties of the polymerizable liquid crystal compound, an aromatic ring having 10 or more π electrons is preferable, an aromatic ring having 10 to 18 π electrons is more preferable, and an aromatic ring having 10 to 14 π electrons is still more preferable.

Among these, $Ar^3$ in Formula (I) is preferably a group represented by Formula (III).

(III)

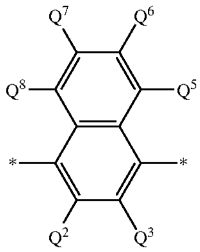

In Formula (III), $Q^2$, $Q^3$, $Q^5$, $Q^6$, $Q^7$, and $Q^8$ each independently represent a hydrogen atom or a substituent. *represents a bonding position.

In Formula (III), it is preferable that all of $Q^2$, $Q^3$, $Q^5$, $Q^6$, $Q^7$, and $Q^8$ be hydrogen atoms or one or two of $Q^2$, $Q^3$, $Q^5$, $Q^6$, $Q^7$, and $Q^8$ represent substituents. It is more preferable that one or two of $Q^2$, $Q^3$, $Q^5$, $Q^6$, $Q^7$, and $Q^8$ represent substituents and the others represent hydrogen atoms, and it is still more preferable that one thereof represent a substituent and the others represent hydrogen atoms.

In Formula (III), as a group representing the substituent among $Q^2$, $Q^3$, $Q^5$, $Q^6$, $Q^7$, and $Q^8$, any of $Q^5$, $Q^6$, $Q^7$, or $Q^8$ is preferable, and it is more preferable that at least one of $Q^5$ or $Q^8$ represent a substituent or at least one of $Q^6$ or $Q^7$ represent a substituent.

In Formula (III), examples of the substituent represented by $Q^2$, $Q^3$, $Q^5$, $Q^6$, $Q^7$, and $Q^8$ include the same ones as the substituents which may be included in the aromatic ring which is one aspect of the ring $B^1$ described above, including suitable aspects thereof.

Among these, an alkyl group having 1 to 4 carbon atoms, an alkoxy group having 1 to 4 carbon atoms, a group in which an oxycarbonyl group is bonded to an alkyl group having 1 to 4 carbon atoms, a group in which a carbonyloxy group is bonded to an alkyl group having 1 to 4 carbon atoms, a fluorine atom, or a chlorine atom is preferable; and an alkyl group having 1 to 4 carbon atoms, a methoxy group, an ethoxy group, a methoxycarbonyl group, or a methylcarbonyloxy group is more preferable.

In addition, suitable specific examples of $Ar^3$ in Formula (I) include groups represented by Formulae (IV-1) to (IV-3).

(IV-1)

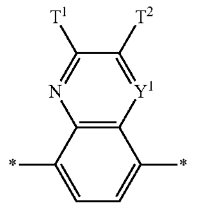

(IV-2)

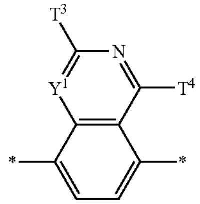

(IV-3)

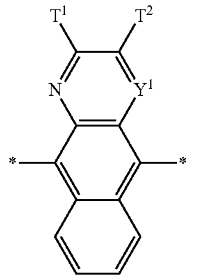

In Formulae (IV-1) to (IV-3), $Y^1$ represents —C(Ry)= or —N=, and Ry represents a hydrogen atom, a fluorine atom, a chlorine atom, a trifluoromethyl group, a trifluoromethoxy group, an alkyl group having 1 to 12 carbon atoms, or a phenyl group.

In Formulae (IV-1) to (IV-3), $T^1$, $T^2$, and $T^3$ each independently represent a hydrogen atom, a fluorine atom, a chlorine atom, a trifluoromethyl group, a trifluoromethoxy group, an alkyl group having 1 to 12 carbon atoms, an alkoxy group having 1 to 12 carbon atoms, an alkoxycarbonyl group having 1 to 12 carbon atoms, an alkylcarbonyl group having 1 to 12 carbon atoms, an aromatic ring having 6 to 18 $\pi$ electrons, or a monovalent organic group in which at least one —$CH_2$— in an alkyl group, an alkoxy group, an alkoxycarbonyl group, or an alkylcarbonyl group is substituted with —O—, —CO—, or —S—. In addition, $T^1$ and $T^2$ may be bonded to each other to form a ring.

In Formulae (IV-1) to (IV-3), $T^4$'s each independently represent a hydrogen atom, a fluorine atom, a chlorine atom, a trifluoromethyl group, a trifluoromethoxy group, an alkyl group having 1 to 12 carbon atoms, or a phenyl group. *represents a bonding position.

In Formula (I), $Ar^1$ and $Ar^2$ are preferably an aromatic ring having 6 to 10 $\pi$ electrons, more preferably an aromatic ring having 6 $\pi$electrons, and still more preferably a benzene ring (for example, a 1,4-phenylene group).

In Formula (I), examples of the substituent which may be included in the aromatic ring represented by $Ar^1$ and $Ar^2$ include the same ones as the substituents which may be included in the aromatic ring which is one aspect of the ring $B^1$ described above, including suitable aspects thereof.

In Formula (I), examples of the alicyclic ring which may have a substituent, represented by $Cy^1$ and $Cy^2$, include the same ones as the alicyclic rings which may have a substituent, which are one aspect of the ring $B^1$ described above, including suitable aspects thereof.

From the viewpoint that the effects of the present invention are more excellent, the content of the liquid crystal compound is preferably 50% to 99% by mass, and more preferably 75% to 90% by mass with respect to the total mass of the light absorption anisotropic layer.

Other Components

The light absorption anisotropic layer may contain other components in addition to the components described above. Examples of other components include a vertical alignment agent and a leveling agent.

Examples of the vertical alignment agent include a boronic acid compound and an onium salt.

A compound represented by Formula (A) is preferable as the boronic acid compound.

Formula (A)

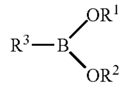

In Formula (A), $R^1$ and $R^2$ each independently represent a hydrogen atom, a substituted or unsubstituted aliphatic hydrocarbon group, a substituted or unsubstituted aryl group, or a substituted or unsubstituted heterocyclic group. $R^3$ represents a substituent containing a (meth)acrylic group.

Specific examples of the boronic acid compound include boronic acid compounds represented by General Formula (I) described in paragraphs to of JP2008-225281A.

A compound represented by Formula (B) is preferable as the onium salt.

Formula (B)

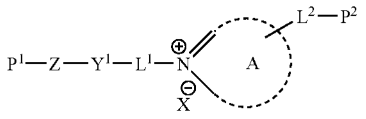

In Formula (B), the ring A represents a quaternary ammonium ion consisting of a nitrogen-containing heterocyclic ring. $X^-$ represents an anion. $L^1$ represents a divalent linking group. $L^2$ represents a single bond or a divalent linking group. $Y^1$ represents a divalent linking group having a 5- or 6-membered ring as a partial structure. Z represents a divalent linking group having 2 to 20 alkylene groups as a partial structure. $P^1$ and $P^2$ each independently represent a monovalent substituent having a polymerizable ethylenically unsaturated bond.

Specific examples of the onium salt include onium salts described in paragraphs [0052] to [0058] to of JP2012-

208397A, onium salts described in paragraphs [0024] to [0055] of JP2008-026730A, and onium salts described in JP2002-037777A.

In a case where the light absorption anisotropic layer contains a vertical alignment agent, the content of the vertical alignment agent is preferably 0.1% to 400% by mass, and more preferably 0.5% to 350% by mass with respect to the total mass of the liquid crystal compound.

The vertical alignment agents may be used alone or in combination of two or more kinds thereof. In a case where two or more kinds of vertical alignment agents are used, the total amount thereof is preferably within the above range.

The light absorption anisotropic layer may contain a leveling agent. In a case where a composition for forming a light absorption anisotropic layer (light absorption anisotropic layer) to be described later contains a leveling agent, surface roughening due to the drying air applied to the surface of the light absorption anisotropic layer is suppressed, and the dichroic substance is more uniformly aligned.

The leveling agent is not particularly limited, but a leveling agent containing a fluorine atom (fluorine-based leveling agent) or a leveling agent containing a silicon atom (silicon-based leveling agent) is preferable, and a fluorine-based leveling agent is more preferable.

Examples of the fluorine-based leveling agent include fatty acid esters of polyvalent carboxylic acids in which a part of a fatty acid is substituted with a fluoroalkyl group and polyacrylates having a fluoro substituent.

Specific examples of the leveling agent include compounds described in paragraphs [0046] to [0052] of JP2004-331812A and compounds described in paragraphs [0038] to [0052] of JP2008-257205A.

In a case where the light absorption anisotropic layer contains a liquid crystal compound and a leveling agent, the content of the leveling agent is preferably 0.001% to 10% by mass, and more preferably 0.01% to 5% by mass with respect to the total mass of the liquid crystal compound.

The leveling agents may be used alone or in combination of two or more kinds thereof. In a case where two or more kinds of leveling agents are used, the total amount thereof is preferably within the above range.

Composition for Forming Light Absorption Anisotropic Layer

The light absorption anisotropic layer is preferably formed of a composition for forming a light absorption anisotropic layer containing a dichroic substance and a liquid crystal compound.

The composition for forming a light absorption anisotropic layer preferably contains a solvent and the like to be described later in addition to the dichroic substance and the liquid crystal compound, and may further contain other components described above.

Examples of the dichroic substance contained in the composition for forming a light absorption anisotropic layer include a dichroic substance which can be contained in the light absorption anisotropic layer.

The content of the dichroic substance with respect to the total solid content mass of the composition for forming a light absorption anisotropic layer is preferably the same as the content of the dichroic substance with respect to the total mass of the light absorption anisotropic layer.

Here, the "total solid content in the composition for forming a light absorption anisotropic layer" denotes components excluding the solvent, and specific examples of the solid content include the dichroic substance, the liquid crystal compound, and the above-described other components.

The liquid crystal compound and other components which can be contained in the composition for forming a light absorption anisotropic layer are respectively the same as the liquid crystal compound and other components which can be contained in the light absorption anisotropic layer.

It is preferable that the content of the liquid crystal compound and the content of other components with respect to the total solid content mass of the composition for forming a light absorption anisotropic layer be respectively the same as the content of the liquid crystal compound and the content of other components with respect to the total mass of the light absorption anisotropic layer.

From the viewpoint of workability, the composition for forming a light absorption anisotropic layer preferably contains a solvent.

Examples of the solvent include organic solvents such as ketones, ethers, aliphatic hydrocarbons, alicyclic hydrocarbons, aromatic hydrocarbons, carbon halides, esters, alcohols, cellosolves, cellosolve acetates, sulfoxides, amides, and heterocyclic compounds, and water.

These solvents may be used alone or in combination of two or more kinds thereof.

Among these solvents, organic solvents are preferable, and carbon halides or ketones are more preferable.

In a case where the composition for forming a light absorption anisotropic layer contains a solvent, the content of the solvent is preferably 80% to 99% by mass, more preferably 83% to 97% by mass, and even more preferably 85% to 95% by mass with respect to the total mass of the composition for forming a light absorption anisotropic layer.

The composition for forming a light absorption anisotropic layer may contain a polymerization initiator.

The polymerization initiator is not particularly limited, but a photosensitive compound, that is, a photopolymerization initiator is preferable.

Commercially available products can also be used as such a photopolymerization initiator, and examples thereof include IRGACURE 184, IRGACURE 907, IRGACURE 369, IRGACURE 651, IRGACURE 819, IRGACURE OXE-01, and IRGACURE OXE-02, manufactured by BASF SE.

The polymerization initiators may be used alone or in combination of two or more kinds thereof.

In a case where the composition for forming a light absorption anisotropic layer contains a polymerization initiator, the content of the polymerization initiator is preferably 0.01% to 30% by mass, and more preferably 0.1% to 15% by mass with respect to the total solid content of the composition for forming a light absorption anisotropic layer.

Method of Producing Light Absorption Anisotropic Layer

The method of producing the light absorption anisotropic layer is not particularly limited, but a method including a step of coating an alignment film with the composition for forming a light absorption anisotropic layer containing a dichroic substance and a liquid crystal compound to form a coating film (hereinafter, also referred to as "coating film forming step") and a step of aligning a liquid crystal component contained in the coating film (hereinafter, also referred to as "aligning step") in this order (hereinafter, also referred to as "present production method") is preferable from the viewpoint of a further increase of the alignment degree of the dichroic substance.

Further, the liquid crystal component is a component containing not only the liquid crystal compound described above but also a dichroic substance having liquid crystallinity.

Hereinafter, the respective steps will be described.

The coating film forming step is a step of coating an alignment film with the composition for forming a light absorption anisotropic layer to form a coating film.

The alignment film is easily coated with the composition for forming a light absorption anisotropic layer by using the composition for forming a light absorption anisotropic layer which contains the above-described solvent or using a liquid-like material such as a melt obtained by heating the composition for forming a light absorption anisotropic layer.

Examples of the coating method using the composition for forming a light absorption anisotropic layer include known methods such as a roll coating method, a gravure printing method, a spin coating method, a wire bar coating method, an extrusion coating method, a direct gravure coating method, a reverse gravure coating method, a die coating method, a spraying method, and an ink jet method.

The alignment film may be any film as long as it is a film in which the liquid crystal component which can be contained in the composition for forming a light absorption anisotropic layer is aligned.

The alignment film can be provided by methods such as a rubbing treatment performed on a film surface of an organic compound (preferably a polymer), oblique vapor deposition of an inorganic compound, formation of a layer having microgrooves, or accumulation of an organic compound (such as ω-tricosanoic acid, dioctadecyl methylammonium chloride, or methyl stearylate) using a Langmuir-Blodgett method (LB film). Furthermore, there have been known alignment films having an aligning function imparted thereto by applying an electrical field, applying a magnetic field, or light irradiation. Among these, in the present invention, an alignment film formed by performing a rubbing treatment is preferable from the viewpoint of easily controlling the pretilt angle of the alignment film, and a photo-alignment film formed by irradiation with light is also preferable from the viewpoint of the uniformity of alignment.

As the photo-alignment film, a photo-alignment film containing an azobenzene coloring agent, polyvinyl cinnamate, or the like is used.

The dichroic substance in the light absorption anisotropic layer can be aligned by irradiating a photo-alignment layer with ultraviolet rays in an oblique direction at an angle to the normal direction of the photo-alignment layer, generating anisotropy with an inclination with respect to the normal direction of the photo-alignment layer, and aligning the light absorption anisotropic layer thereon.

In addition, a liquid crystal layer in which the liquid crystal compound is hybrid-aligned can also be used as the alignment film.

The aligning step is a step of aligning the liquid crystal component (particularly, the dichroic substance) contained in the coating film. In the aligning step, the dichroic substance is considered to be aligned along the liquid crystal compound aligned by the alignment film.

The aligning step may have a drying treatment. By the drying treatment, components such as a solvent can be removed from the coating film. The drying treatment may be performed by a method of leaving the coating film for a predetermined time at room temperature (for example, natural drying), or a heating and/or air blowing method.

The aligning step preferably has a heating treatment. In this manner, the dichroic substance contained in the coating film is further aligned, and the alignment degree of the dichroic substance is further increased.

From the viewpoint of manufacturing suitability and the like, the heating treatment is preferably performed at 10° C. to 250° C., and more preferably 25° C. to 190° C. Further, the heating time is preferably 1 to 300 seconds, and more preferably 1 to 60 seconds.

The aligning step may have a cooling treatment to be performed after the heating treatment. The cooling treatment is a treatment of cooling the coating film after heating to about room temperature (20° C. to 25° C.). In this manner, the alignment of the dichroic substance contained in the coating film is further fixed, and the alignment degree of the dichroic substance is further increased. The cooling unit is not particularly limited, and the cooling can be performed by a known method.

The light absorption anisotropic layer according to the present invention can be obtained by performing the above-described steps.

The present production method may have a step of curing the light absorption anisotropic layer after the aligning step (hereinafter, also referred to as "curing step").

For example, the curing step is performed by heating and/or light irradiation (exposure). Among these, light irradiation is preferably performed to conduct the curing step.

Various light sources such as infrared rays, visible light, and ultraviolet rays can be used as the light source for curing, but ultraviolet rays are preferable. In addition, in the curing, ultraviolet rays may be applied while heating is performed. Otherwise, ultraviolet rays may be applied via a filter which transmits only a component with a specific wavelength.

In addition, exposure may be performed under a nitrogen atmosphere. In a case where curing of the light absorption anisotropic layer proceeds by radical polymerization, inhibition of the polymerization by oxygen is reduced, and thus the exposure is preferably performed under a nitrogen atmosphere.

The thickness of the light absorption anisotropic layer is not particularly limited, but from the viewpoint that the effects of the present invention are more excellent, the thickness is preferably 0.5 to 7 μm, and more preferably 1.0 to 3 μm.

Third Light Absorption Anisotropic Layer

Due to the reason that a change in tint can be suppressed, the optical laminate according to the embodiment of the present invention preferably has, in addition to the first light absorption anisotropic layer and the second light absorption anisotropic layer, a third light absorption anisotropic layer containing a dichroic substance between the first retardation layer and the second retardation layer.

Here, in the third light absorption anisotropic layer, as in the first light absorption anisotropic layer and the second light absorption anisotropic layer, the angle formed between a transmittance central axis of the third light absorption anisotropic layer and a normal direction of a surface of the third light absorption anisotropic layer is 0° or more and 45° or less, preferably 0° or more and less than 45°, more preferably 0° or more and 35° or less, and still more preferably 0° or more and less than 35°.

In addition, in a case where the optical laminate according to the embodiment of the present invention has a third light absorption anisotropic layer, the transmittance central axis of the first light absorption anisotropic layer, the transmittance central axis of the second light absorption anisotropic layer, and the transmittance central axis of the third light absorption anisotropic layer are preferably parallel to each other due to the reason that the light transmitting properties in a specific direction are improved.

The components (dichroic substance, liquid crystal compound, and the like) contained in the third light absorption anisotropic layer and the forming method of the third light absorption anisotropic layer are the same as those for the first light absorption anisotropic layer and the second light absorption anisotropic layer.

Retardation Layer

The retardation layer included in the optical laminate according to the embodiment of the present invention is not particularly limited as long as it is a $\lambda/2$ wavelength plate, but is preferably a layer formed of a composition containing a liquid crystal compound.

Here, in general, liquid crystal compounds can be classified into a rod-like type and a disk-like type according to the shape thereof. Furthermore, each type includes a low molecular type and a high molecular type. The term high molecular generally refers to a compound having a degree of polymerization of 100 or more (Polymer Physics-Phase Transition Dynamics, written by Masao Doi, page 2, published by Iwanami Shoten, 1992). In the present invention, any liquid crystal compound can be used, and a rod-like liquid crystal compound or a discotic liquid crystal compound (disk-like liquid crystal compound) is preferable. In addition, a liquid crystal compound which is a monomer or has a relatively low molecular weight with a degree of polymerization of less than 100 is preferable.

In addition, examples of the polymerizable group of the polymerizable liquid crystal compound include an acryloyl group, a methacryloyl group, an epoxy group, and a vinyl group.

By polymerizing such a polymerizable liquid crystal compound, the alignment of the liquid crystal compound can be fixed. After fixing of the liquid crystal compound by polymerization, it is no longer necessary for the compound to exhibit crystallinity.

As the rod-like liquid crystal compound, azomethines, azoxys, cyano biphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolans, and alkenylcyclohexylbenzonitriles are preferably used. These rod-like liquid crystal compounds are fixed by introducing a polymerizable group to the terminal structure of the rod-like liquid crystal compound (the same as in the disk-like liquid crystal described later) and using a polymerization and curing reaction. As a specific example, curing a polymerizable nematic rod-like liquid crystal compound with ultraviolet rays is described in JP2006-209073A. In addition, as well as the above-described low-molecular-weight liquid crystal compound, a polymer liquid crystal compound can also be used. The polymer liquid crystal compound is a polymer having a side chain corresponding to the above-described low-molecular-weight liquid crystal compound. JP1993-53016A (JP-H5-53016A) and the like describes an optical compensation sheet formed of a polymer liquid crystal compound.

The disk-like liquid crystal compound includes benzene derivatives described in C. Destrade et. al.'s study report, "Mol. Cryst.", vol. 71, page 111 (1981); truxene derivatives described in C. Destrade et. al.'s study report, "Mol. Cryst.", vol. 122, page 141 (1985) and "Physics lett, A", vol. 78, page 82 (1990); cyclohexane derivatives described in B. Kohne et. al.'s study report, "Angew. Chem.", vol. 96, page 70 (1984); and azacrown-based or phenyl acetylene-based macrocycles described in J. M. Lehn et. al.'s study report, "J. Chem. Commun.", page 1794 (1985) and J. Zhang et. al.'s study report, "J. Am. Chem. Soc.", vol. 116, page 2655 (1994).

A compound in which molecules of a disk-like liquid crystal compound exhibit liquid crystallinity with a structure in which a linear alkyl group, alkoxy group, or substituted benzoyloxy group is radially substituted as a side chain of mother nuclei at the centers of the molecules is also included. A compound in which molecules or molecular aggregates have rotation symmetry and to which certain alignment can be given is preferable. A retardation layer formed from a composition containing a disk-like liquid crystal compound does not need to exhibit liquid crystallinity in a state of being finally included in the retardation layer. For example, in a case where low-molecular-weight disk-like liquid crystalline molecules having a group which reacts with heat or light are polymerized by heating or light irradiation to increase the molecular weight, the liquid crystallinity is lost, but a retardation layer containing such a polymer compound can also be used in the present invention. Preferable examples of the disk-like liquid crystal compound include compounds described in JP1996-50206A (JP-H8-50206A). In addition, the polymerization of the disk-like liquid crystalline molecules is described in JP1996-27284A (JP-H8-27284A).

In order to fix the disk-like liquid crystalline molecules by polymerization, it is necessary to bond a polymerizable group as a substituent to the disk-like cores of the disk-like liquid crystalline molecules. A compound in which the disk-like core and the polymerizable group are bonded via a linking group is preferable, whereby the compound can maintain the alignment state even under the polymerization reaction. Examples thereof include compounds described in paragraph Nos. to of the specification of JP2000-155216A.

In the present invention, the first retardation layer and the second retardation layer are preferably layers formed of a composition containing a disk-like liquid crystal compound.

In the present invention, due to the reason that a change in tint can be suppressed, the first retardation layer and the second retardation layer are preferably layers formed of a composition containing a rod-like liquid crystal compound having reverse wavelength dispersibility.

Examples of such a rod-like liquid crystal compound having reverse wavelength dispersibility include those (particularly, a polymerizable liquid crystal compound having reverse wavelength dispersibility) described as an optional liquid crystal compound contained in the light absorption anisotropic layer described above.

In addition, in the present invention, due to the reason that the light shielding properties in a direction other than a specific direction are improved and a change in tint can thus be suppressed, it is preferable that any one of the first retardation layer or the second retardation layer be a layer formed of a composition containing a rod-like liquid crystal compound and the other be a layer formed of a composition containing a disk-like liquid crystal compound, and it is more preferable that any one of the first retardation layer or the second retardation layer be a layer formed of a composition containing a rod-like liquid crystal compound having reverse wavelength dispersibility and the other be a layer formed of a composition containing a disk-like liquid crystal compound.

Examples of such a rod-like liquid crystal compound or rod-like liquid crystal compound having reverse wavelength dispersibility include those (particularly, a polymerizable liquid crystal compound having reverse wavelength dispersibility and a polymerizable liquid crystal compound having forward wavelength dispersibility) described as an optional liquid crystal compound contained in the light absorption anisotropic layer described above.

In the present invention, in a case where the retardation layer is a layer formed of a composition containing a liquid crystal compound, examples of the component other than the liquid crystal compound contained in the composition include a component other than the dichroic substance contained in the light absorption anisotropic layer described above.

Examples of the method of forming the retardation layer include a method in which a composition containing a liquid crystal compound is used for forming a desired alignment state, and then the alignment state is fixed by polymerization.

Here, polymerization conditions are not particularly limited, but ultraviolet rays are preferably used in the polymerization by light irradiation. The irradiation dose is preferably 10 $mJ/cm^2$ to 50 $J/cm^2$, more preferably 20 $mJ/cm^2$ to 5 $J/cm^2$, still more preferably 30 $mJ/cm^2$ to 3 $J/cm^2$, and particularly preferably 50 to 1,000 $mJ/cm^2$. In addition, in order to promote the polymerization reaction, the reaction may be carried out under heating conditions.

The thickness of the retardation layer is not particularly limited, but from the viewpoint that the effects of the present invention are more excellent, the thickness is preferably 0.1 μm to 20 μm, more preferably 0.5 μm to 15 μm, and still more preferably 1 μm to 10 μm.

In the present invention, due to the reason that the light transmitting properties in a specific direction are improved, the first retardation layer and the second retardation layer are preferably in direct contact with each other or laminated via only at least one of an adhesive layer, a pressure sensitive adhesive layer, or an alignment film to be described later.

Here, the expression "laminated via only at least one" means that in a case of using any one of an adhesive layer, a pressure sensitive adhesive layer, or an alignment film, the laminate is formed via only one of them, and in a case of using any two (for example, a pressure sensitive adhesive layer and an alignment film) of an adhesive layer, a pressure sensitive adhesive layer, or an alignment film, the laminate is formed via only two of them.

In addition, in the present invention, the angle formed between the slow axis of the first retardation layer and the slow axis of the second retardation layer is within a range of 45°±10°, but is preferably within a range of 45°±8°, and more preferably within a range of 45°±5°.

As described above, the present invention provides an optical laminate including a first light absorption anisotropic layer, a first retardation layer, a second retardation layer, and a second light absorption anisotropic layer in this order, but an optical laminate having an aspect in which two laminates consisting of the above layers are laminated, that is, having a first light absorption anisotropic layer, a first retardation layer, a second retardation layer, a second light absorption anisotropic layer, a first light absorption anisotropic layer, a first retardation layer, a second retardation layer, and a second light absorption anisotropic layer in this order, an optical laminate having an aspect in which two light absorption anisotropic layers provided continuously at the center form a single layer, that is, having a first light absorption anisotropic layer, a first retardation layer, a second retardation layer, a light absorption anisotropic layer (second/first combination), a first retardation layer, a second retardation layer, and a second light absorption anisotropic layer in this order, or an optical laminate having an aspect in which a third light absorption anisotropic layer is provided, that is, having a first light absorption anisotropic layer, a first retardation layer, a third light absorption anisotropic layer, a second retardation layer, a light absorption anisotropic layer (second/first combination), a first retardation layer, a third light absorption anisotropic layer, a second retardation layer, and a second light absorption anisotropic layer in this order may be provided.

In addition, in the present invention, at least one of the first retardation layer or the second retardation layer is preferably a layer formed of two retardation layers.

Positive C-Plate

In the present invention, due to the reason that the light shielding properties in a direction other than a specific direction are improved and a change in tint can thus be suppressed, a positive C-plate is preferably provided between the first retardation layer and the second retardation layer.

Here, the positive C-plate (positive C-plate) is defined as follows.

In a case where a refractive index in a film in-plane slow axis direction (in a direction in which an in-plane refractive index is maximum) is defined as nx, a refractive index in an in-plane direction orthogonal to the in-plane slow axis is defined as ny, and a refractive index in a thickness direction is defined as nz, the positive C-plate satisfies a relationship represented by Formula (C1). The positive C-plate shows a negative Rth.

$$nz > nx \approx ny \quad \text{Expression (C1)}$$

The symbol "≈" includes not only a case where both are exactly the same, but also a case where both are substantially the same. The expression "substantially the same" means that, for example, a case where (nx−ny)×d (in which d is a thickness of a film) is 0 to 10 nm and preferably 0 to 5 nm is also included in "nx≈ny".

The absolute value of a thickness direction retardation of the positive C-plate at a wavelength of 550 nm is not particularly limited, but from the viewpoint that the effects of the present invention are more excellent, it is preferably 10 to 400 nm, and more preferably 100 to 180 nm.

The absolute value of a thickness direction retardation of the positive C-plate at a wavelength of 650 nm is not particularly limited, but from the viewpoint that the effects of the present invention are more excellent, it is preferably 10 to 500 nm, and more preferably 120 to 220 nm.

The material constituting the positive C-plate is not particularly limited, and may be a layer formed of a liquid crystal compound, or a resin film.

Support

The optical laminate according to the embodiment of the present invention may include a support.

The kind of the support is not particularly limited, and known supports can be used. In particular, a transparent support is preferable. The transparent support is intended to refer to a support having a visible light transmittance of 60% or more, which preferably has a visible light transmittance of 80% or more, and more preferably 90% or more.

Examples of the support include a glass substrate and a polymer film.

Examples of the material of the polymer film include a cellulose-based polymer; an acrylic polymer having an acrylic acid ester polymer such as polymethyl methacrylate and a lactone ring-containing polymer; a thermoplastic norbornene-based polymer; a polycarbonate-based polymer; a polyester-based polymer such as polyethylene terephthalate and polyethylene naphthalate; a styrene-based polymer such as polystyrene and an acrylonitrile-styrene copolymer; a polyolefin-based polymer such as polyethylene, polypropylene, and an ethylene-propylene copolymer; a vinyl chloride-based polymer; an amide-based polymer such as nylon and aromatic polyamide; an imide-based polymer; a sulfone-based polymer; a polyethersulfone-based polymer; a polyetheretherketone-based polymer; a polyphenylene sulfide-based polymer; a vinylidene chloride-based polymer; a vinyl alcohol-based polymer; a vinyl butyral-based polymer; an arylate-based polymer; a polyoxymethylene-based polymer; an epoxy-based polymer; and a polymer obtained by mixing the above polymers.

In addition, the support is preferably peelable.

Alignment Film

In a case where the above-described light absorption anisotropic layer and retardation layer are layers formed of a composition containing a liquid crystal compound, the optical laminate according to the embodiment of the present invention preferably has an alignment film as a layer adjacent to the above layers.

Specific examples of the alignment film include a layer formed of polyvinyl alcohol, polyimide, or the like, which has been or has not been subjected to a rubbing treatment; and a photo-alignment film formed of polyvinyl cinnamate, an azo-based dye, or the like, which has been or has not been subjected to a polarizing exposure treatment.

The thickness of the alignment film is preferably 0.01 to 10 μm, and more preferably 0.01 to 1 μm.

Pressure Sensitive Adhesive Layer

The optical laminate according to the embodiment of the present invention may have a pressure sensitive adhesive layer.

The pressure sensitive adhesive layer is preferably a transparent and optically isotropic adhesive similar to that used in a typical image display device, and a pressure sensitive type adhesive is typically used.

The pressure sensitive adhesive layer may be blended with appropriate additives such as a crosslinking agent (for example, an isocyanate-based crosslinking agent and an epoxy-based crosslinking agent), a viscosity imparting agent (for example, a rosin derivative resin, a polyterpene resin, a petroleum resin, and an oil-soluble phenol resin), a plasticizer, a filler, an antiaging agent, a surfactant, an ultraviolet absorbing agent, a light stabilizer, and an antioxidant in addition to a parent material (pressure sensitive adhesive), conductive particles, and thermally expandable particles used as necessary.

Adhesive Layer

The optical laminate according to the embodiment of the present invention may have an adhesive layer.

The adhesive layer exhibits adhesiveness due to drying or a reaction after bonding.

A polyvinyl alcohol-based adhesive (PVA-based adhesive) exhibits adhesiveness due to drying, and is capable of bonding materials to each other.

Specific examples of the curable adhesive which exhibits adhesiveness due to a reaction include an active energy ray-curable adhesive such as a (meth)acrylate-based adhesive and a cationic polymerization curable adhesive. The (meth)acrylate denotes acrylate and/or methacrylate. Examples of the curable component in the (meth)acrylate-based adhesive include a compound having a (meth)acryloyl group and a compound having a vinyl group. In addition, as the cationic polymerization curable adhesive, a compound having an epoxy group or an oxetanyl group can also be used. The compound having an epoxy group is not particularly limited as long as it has at least two epoxy groups in the molecule, and various generally known curable epoxy compounds can be used. Preferable examples of the epoxy compound include a compound (aromatic epoxy compound) having at least two epoxy groups and at least one aromatic ring in the molecule and a compound (alicyclic epoxy compound) having at least two epoxy groups in the molecule, in which at least one of the epoxy groups is formed between two adjacent carbon atoms constituting an alicyclic ring.

Among these, from the viewpoint of heat deformation resistance, an ultraviolet curable adhesive which is cured by irradiation with ultraviolet rays is preferably used.

Image Display Device

An image display device according to the embodiment of the present invention is an image display device having the above-described optical laminate according to the embodiment of the present invention.

Display Element

The display element used in the image display device according to the embodiment of the present invention is not particularly limited, and examples thereof include a liquid crystal cell, an organic electroluminescence (hereinafter, abbreviated as "EL") display panel, and a plasma display panel.

Among these, a liquid crystal cell or an organic EL display panel is preferable. That is, as the display device according to the embodiment of the present invention, a liquid crystal display device obtained by using a liquid crystal cell as a display element or an organic EL display device obtained by using an organic EL display panel as a display element is preferable.

Some image display devices are thin and can be formed into a curved surface. Since the optical anisotropic absorption film used in the present invention is thin and easily bent, the film can be suitably applied to an image display device having a curved display surface.

In addition, some image display devices have a pixel density of more than 250 ppi and are capable of high-definition display. The optical anisotropic absorption film used in the present invention can be suitably applied to such a high-definition image display device without causing moire.

Liquid Crystal Display Device

Preferable examples of the liquid crystal display device which is an example of the image display device according to the embodiment of the present invention include an aspect in which the above-described optical laminate having a polarizer and a liquid crystal cell are provided.

Examples of the specific configuration thereof include a configuration in which the optical laminate according to the embodiment of the present invention is disposed on a front-side polarizing plate or a rear-side polarizing plate. In these configurations, viewing angle control is possible in which light is shielded in the vertical direction or the horizontal direction.

In addition, the optical laminate according to the embodiment of the present invention may be disposed on both the front-side polarizing plate and the rear-side polarizing plate. With such a configuration, viewing angle control is possible in which light is shielded in all directions and only light in the front direction is transmitted.

Furthermore, a plurality of the optical laminates according to the embodiment of the present invention may be laminated via a retardation layer. Transmission performance and light shielding performance can be controlled by controlling a retardation value and an optical axis direction. For example, in a case where a polarizer, an optical laminate, a λ/2 wavelength plate (the axis angle is deviated by 45° from an alignment direction of the polarizer), and an optical laminate are disposed in this order, viewing angle control is possible in which light is shielded in all directions and only light in the front direction is transmitted. As a retardation layer, a positive A-plate, a negative A-plate, a positive C-plate, a negative C-plate, a B-plate, an O-plate, or the like can be used. From the viewpoint of reducing the thickness of the viewing angle control system, the thickness of the retardation layer is preferably small as long as the optical characteristics, mechanical properties, and manufacturing suitability are not impaired, and specifically, the thickness is preferably 1 to 150 μm, more preferably 1 to 70 μm, and still more preferably 1 to 30 μm.

Hereinafter, the liquid crystal cell constituting the liquid crystal display device will be described in detail.

Liquid Crystal Cell

The liquid crystal cell used for the liquid crystal display device is preferably a vertical alignment (VA) mode, an optically compensated bend (OCB) mode, an in-plane-switching (IPS) mode, or a twisted nematic (TN) mode; however, the liquid crystal cell is not limited thereto.

In a TN mode liquid crystal cell, rod-like liquid crystal molecules are substantially horizontally aligned with no application of a voltage, and further twisted and aligned at 60° to 120°. The TN mode liquid crystal cell is most frequently used as a color TFT liquid crystal display device and is described in a plurality of documents.

In a VA mode liquid crystal cell, rod-like liquid crystalline molecules are substantially vertically aligned with no application of a voltage. The VA mode liquid crystal cell includes (1) a narrowly-defined VA mode liquid crystal cell in which rod-like liquid crystalline molecules are substantially vertically aligned with no application of a voltage, and are substantially horizontally aligned with the application of a voltage (described in JP1990-176625A (JP-H2-176625A)), (2) a (MVA mode) liquid crystal cell in which the VA mode is made into multi-domains in order to expand the viewing angle (described in SID97, Digest of tech. Papers (proceedings) 28 (1997) 845), (3) an (n-ASM mode) liquid crystal cell in which rod-like liquid crystalline molecules are substantially vertically aligned with no application of a voltage, and are twisted and multi-domain aligned with the application of a voltage (described in the proceedings 58 and 59 of Japanese Liquid Crystal Conference (1998)), and (4) a SURVIVAL mode liquid crystal cell (announced at LCD internal 98). In addition, the VA mode liquid crystal cell may be any of a patterned vertical alignment (PVA) type, an optical alignment type, or polymer-sustained alignment (PSA) type. The details of the modes are described in JP2006-215326A and JP2008-538819A.

In an IPS mode liquid crystal cell, a liquid crystal compound is aligned substantially parallel to a substrate, and the application of an electric field parallel to the substrate surface causes the liquid crystal molecules to respond planarly. That is, the liquid crystal compound is aligned in the plane in a state in which no electric field is applied. In the IPS mode, black is displayed in a state in which no electric field is applied, and the absorption axes of a pair of upper and lower polarizing plates are orthogonal to each other. A method of improving a viewing angle by reducing light leakage at the time of black display in an oblique direction by using an optical compensation sheet is disclosed in JP1998-54982A (JP-H10-54982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

Organic EL Display Device

Suitable examples of the organic EL display device which is an example of the image display device according to the embodiment of the present invention include an aspect in which the above-described optical laminate having a polarizer, a λ/4 plate, and an organic EL display panel are provided in this order.

In addition, similarly to the liquid crystal display device described above, a plurality of the optical laminates according to the embodiment of the present invention may be laminated via a retardation layer and disposed on an organic EL display panel. Transmission performance and light shielding performance can be controlled by controlling a retardation value and an optical axis direction.

In addition, the organic EL display panel is a display panel constituted by using an organic EL element obtained by sandwiching an organic light emitting layer (organic electroluminescence layer) between electrodes (between a cathode and an anode). The configuration of the organic EL display panel is not particularly limited, and a known configuration is employed.

EXAMPLES

Hereinafter, the present invention will be described in more detail on the basis of examples. Materials, used amounts, ratios, treatment contents, treatment procedures, and the like described in the following examples can be appropriately changed without departing from the gist of the present invention. Therefore, the range of the present invention will not be restrictively interpreted by the following examples.

Example 1

Formation of Light Absorption Anisotropic Layer A

<Formation of Alignment Film 1>

A surface of a cellulose acylate film (TAC base material; manufactured by FUJIFILM Corporation, TG40) with a thickness of 40 μm was saponified with an alkaline solution, and coated with the following composition 1 for forming an alignment film using a wire bar.

The support with the coating film formed thereon was dried with hot air at 60° C for 60 seconds and further dried with hot air at 100° C for 120 seconds to form an alignment film 1, thereby obtaining a TAC film with an alignment film.

The alignment film 1 had a film thickness of 1 μm.

| Composition 1 for Forming Alignment Film | |
|---|---|
| Modified polyvinyl alcohol PVA-1 shown below | 3.80 parts by mass |
| IRGACURE 2959 | 0.20 parts by mass |
| Water | 70 parts by mass |
| Methanol | 30 parts by mass |

-continued

Modified Polyvinyl Alcohol PVA-1

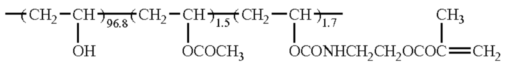

<Formation of Light Absorption Anisotropic Layer A>

The obtained alignment film 1 was continuously coated with the following composition for forming a light absorption anisotropic layer using a wire bar, heated at 120° C. for 60 seconds, and then cooled to room temperature (23° C.). Next, the coating was heated at 80° C. for 60 seconds and cooled to room temperature again.

Thereafter, the coating was irradiated with ultraviolet rays from an LED lamp (central wavelength: 365 nm) for 2 seconds under irradiation conditions of an illuminance of 200 $mW/cm^2$, thereby forming a light absorption anisotropic layer A on the alignment film 1. The light absorption anisotropic layer A had a film thickness of 2.1 μm.

| Composition of Composition for Forming Light Absorption Anisotropic Layer | |
|---|---|
| Dichroic substance D-1 shown below | 0.63 parts by mass |
| Dichroic substance D-2 shown below | 0.17 parts by mass |
| Dichroic substance D-3 shown below | 1.13 parts by mass |
| Polymer liquid crystal compound P-1 shown below | 8.18 parts by mass |
| IRGACURE OXE-02 (manufactured by BASF SE) | 0.16 parts by mass |
| Compound E-1 shown below | 0.12 parts by mass |
| Compound E-2 shown below | 0.12 parts by mass |
| Surfactant F-1 shown below | 0.005 parts by mass |
| Cyclopentanone | 85.00 parts by mass |
| Benzyl alcohol | 4.50 parts by mass |

Dichroic Substance D-1

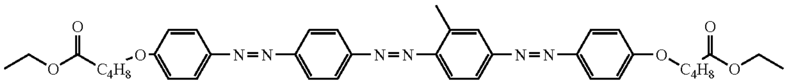

Dichroic Substance D-2

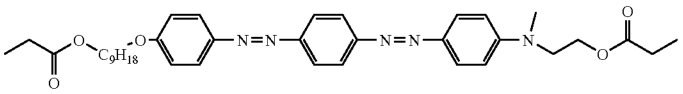

Dichroic Substance D-3

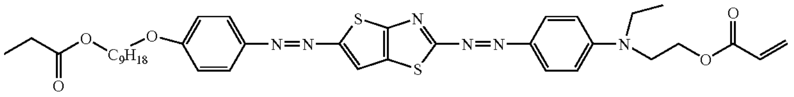

Polymer Liquid Crystal Compound P-1

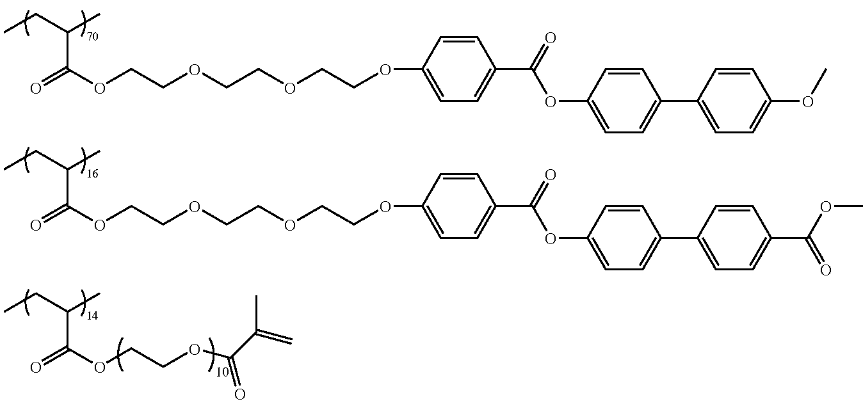

-continued

| Composition of Composition for Forming Light Absorption Anisotropic Layer |
|---|
| Compound E-1<br>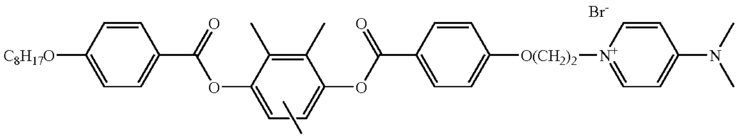 |
| Compound E-2<br>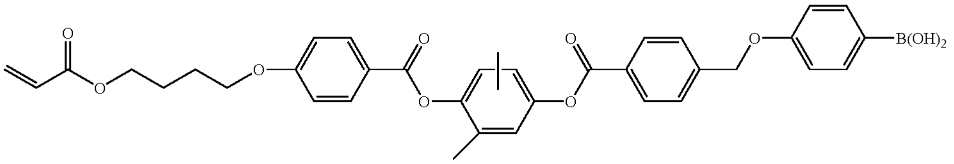 |
| Surfactant F-1<br>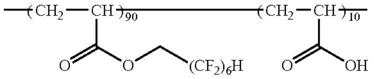 |

Using AxoScan OPMF-1 (manufactured by Opto Science, Inc.), a direction of a transmittance central axis was measured by measuring the transmittance of the produced light absorption anisotropic layer A while changing the polar angle and the azimuthal angle. As a result, the transmittance central axis was perpendicular to the layer surface.

Formation of Retardation Layer A

<Production of Peelable Support>

A peelable support (alignment film 2) was produced by the following procedure on a cellulose acylate film (TAC base material; manufactured by FUJIFILM Corporation, TG40) with a thickness of 40 μm without subjecting the cellulose acylate film to an alkali saponification treatment.

<Formation of Alignment Film 2>

The cellulose acylate film was continuously coated with a composition 2 for forming an alignment film with the following composition using a #14 wire bar. The coating was dried with hot air at 60° C for 60 seconds and further dried with hot air at 100° C for 120 seconds.

| Composition of Composition 2 for Forming Alignment Film | |
|---|---|
| Modified polyvinyl alcohol PVA-2 shown below | 10 parts by mass |
| Water | 371 parts by mass |
| Methanol | 119 parts by mass |
| Glutaraldehyde (crosslinking agent) | 0.5 parts by mass |
| Citric acid ester (manufactured by SANKYO CHEMICAL Co., Ltd., AS3) | 0.175 parts by mass |
| Photopolymerization initiator (IRGACURE 2959, manufactured by BASF SE) | 2.0 parts by mass |

Modified Polyvinyl Alcohol PVA-2

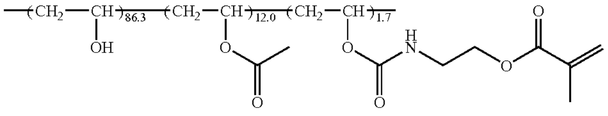

<Formation of Retardation Layer A>

The alignment film 2 produced above was continuously subjected to a rubbing treatment. In this case, the longitudinal direction of the elongated film was parallel to the transport direction, and the angle formed between the longitudinal direction of the film and the rotation axis of the rubbing roller was 90° (in a case where the width direction of the film was defined as 0°, the longitudinal direction of the film was defined as 90°, and the counterclockwise direction was expressed as a positive value with reference to the width direction of the film observed from the alignment film side, the rotation axis of the rubbing roller was 0°).

The alignment film 2 produced above was continuously coated with a retardation layer coating liquid A containing a rod-like liquid crystal compound with the following composition using a #5 wire bar to produce a retardation layer A. The film transportation speed (V) was 26 m/min. In order to dry the solvent of the coating liquid and to mature the alignment of the rod-like liquid crystal compound, the film was heated with hot air at 60° C for 60 seconds and irradiated with UV rays at 60° C to fix the alignment of the liquid crystal compound. The thickness of the retardation layer A was 1.8 μm, Re at 550 nm was 270 nm, and the retardation layer A was a λ/2 wavelength plate. It was confirmed that the average tilt angle of the major axis of the rod-like liquid crystal compound with respect to the film surface was 0° and the liquid crystal compound was horizontally aligned with respect to the film surface. In addition, in a case where the angle of the slow axis of the retardation layer A was orthogonal to the rotation axis of the rubbing roller and the width direction of the film was defined as 0° (the longitudinal direction was 90°), the slow axis was 90° as viewed from the retardation layer A side.

| Composition of Retardation Layer Coating Liquid A | |
|---|---|
| Rod-like liquid crystal compound-1 shown below: | 80 parts by mass |
| Rod-like liquid crystal compound-2 shown below | 20 parts by mass |
| Photopolymerization initiator (IRGACURE 907, manufactured by BASF SE) | 3 parts by mass |
| Sensitizer (KAYACURE DETX, manufactured by Nippon Kayaku Co., Ltd.) | 1 part by mass |
| Surfactant F-2 shown below | 0.13 parts by mass |
| Methyl ethyl ketone | 193 parts by mass |

Rod-Like Liquid Crystal Compound-1

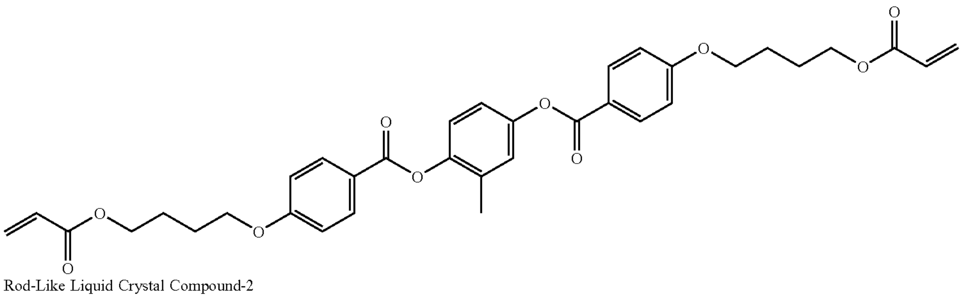

Rod-Like Liquid Crystal Compound-2

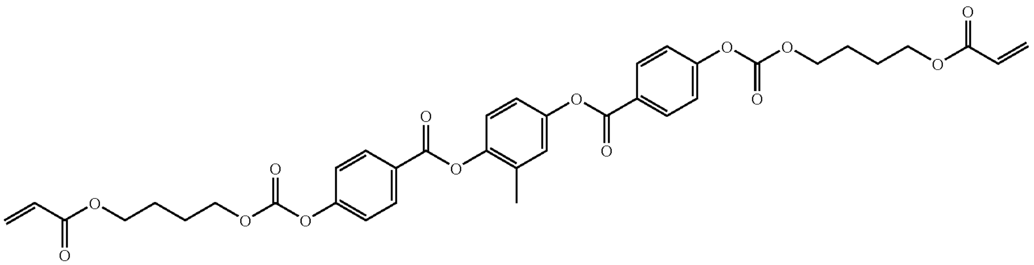 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

Surfactant F-2

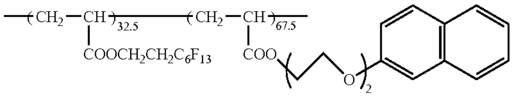

Production of Optical Laminate 1

The surface on which the above-described light absorption anisotropic layer A was formed and the surface on which the above-described retardation layer A was formed were bonded using a commercially available pressure sensitive adhesive (manufactured by Soken Chemical & Engineering Co., Ltd., SK2057), and then the peelable support of the retardation layer A was peeled off between the cellulose acylate film and the alignment film. The layer configuration after peeling of the peelable support is "support/alignment film 1/light absorption anisotropic layer A/pressure sensitive adhesive/retardation layer A/alignment film 2".

Next, the peeling surface (the surface where the alignment film 2 was exposed) and the surface on which a new retardation layer A different from the retardation layer A bonded as above was formed were bonded using a commercially available pressure sensitive adhesive (manufactured by Soken Chemical & Engineering Co., Ltd., SK2057). In this case, the bonding was carried out so that the angle formed between the slow axes of the two bonded retardation layers A was 45°. After the bonding, the peelable support of the retardation layer A was peeled off between the cellulose acylate film and the alignment film in the same manner as described above. The layer configuration after peeling of the peelable support is "support/alignment film 1/light absorption anisotropic layer A/pressure sensitive adhesive/retardation layer A/alignment film 2/pressure sensitive adhesive/retardation layer A/alignment film 2".

Next, the peeling surface (the surface where the alignment film 2 was exposed) and the surface on which a new light absorption anisotropic layer A different from the light absorption anisotropic layer A bonded as above was formed were bonded using a commercially available pressure sensitive adhesive (manufactured by Soken Chemical & Engineering Co., Ltd., SK2057) to produce an optical laminate 1. The layer configuration of the optical laminate 1 is "support/alignment film 1/light absorption anisotropic layer A/pressure sensitive adhesive/retardation layer A/alignment film 2/pressure sensitive adhesive/retardation layer A/alignment film 2/pressure sensitive adhesive/light absorption anisotropic layer A/alignment film 1/support".

Example 2

Formation of Retardation Layer B

<Synthesis of Monomer mA-1>

4-aminocyclohexanol (50.0 g), triethylamine (48.3 g), and N,N-dimethylacetamide (800 g) were weighed in a 2 L three-neck flask comprising a stirring blade, a thermometer, a dropping funnel, and a reflux pipe, and stirred under ice cooling.

Next, methacrylic acid chloride (47.5 g) was added dropwise into the above-described flask for 40 minutes using the dropping funnel, and after completion of the dropwise addition, the reaction liquid was stirred at 40° C for 2 hours.

The reaction liquid was cooled to room temperature (23° C.), and then subjected to suction filtration to remove the precipitated salt. The obtained organic layer was transferred to a 2 L three-neck flask comprising a stirring blade, a thermometer, a dropping funnel, and a reflux pipe, and stirred under water cooling.

Next, N,N-dimethylaminopyridine (10.6 g) and triethylamine (65.9 g) were added into the flask, and 4-n-octyloxy cinnamic acid chloride (127.9 g) dissolved previously in tetrahydrofuran (125 g) was added dropwise into the flask using the dropping funnel for 30minutes. After completion of the dropwise addition, the reaction liquid was stirred at 50° C. for 6 hours. The reaction liquid was cooled to room temperature, and then separation and washing were performed with water. The obtained organic layer was dried with anhydrous magnesium sulfate, and the obtained solution was concentrated to obtain a yellowish white solid.

The obtained yellowish white solid was dissolved in methyl ethyl ketone (400 g) by heating and recrystallized to obtain 76 g of a monomer mA-1 shown below as a white solid (yield 40%).

The following monomer mA-1 corresponds to the monomer forming the above-described repeating unit A-1.

mA-1

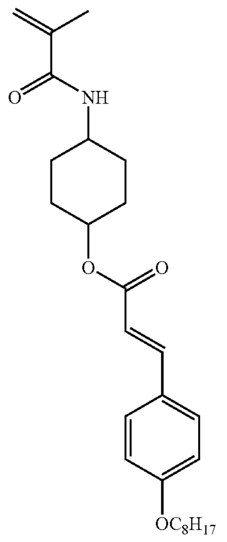

<Other Monomers>

As the following monomer mB-1 forming a repeating unit B-1, CYCLOMER M-100 (manufactured by Daicel Corporation) was used.

mB-1

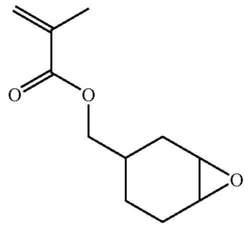

<Synthesis of Polymer P-1>

A flask comprising a cooling pipe, a thermometer, and a stirrer was charged with 2-butanone (5 parts by mass) as a solvent, and while flowing nitrogen in the flask at 5 mL/min, the resultant was refluxed by heating in a water bath. Here, a solution obtained by mixing the monomer mA-1 (1.2 parts by mass), the monomer mB-1 (8.8 parts by mass), 2,2'-azobis (isobutyronitrile) as a polymerization initiator (1 part by mass), and 2-butanone as a solvent (5 parts by mass) was added dropwise thereto for 3 hours, and the obtained reaction liquid was stirred while maintaining the refluxing state for 3 hours. After completion of the reaction, the reaction liquid was allowed to cool to room temperature, and 2-butanone (30 parts by mass) was added to the reaction liquid for dilution to obtain a polymer solution having a polymer concentration of about 20% by mass. The obtained polymer solution was poured into a large excess of methanol to precipitate the polymer, and the precipitate was separated by filtration. The obtained solid content was washed with a large amount of methanol, and then subjected to blast drying at 50° C for 12 hours, and thus a polymer P-1 having a photo-alignment group was obtained.

<Preparation of Composition for Forming Photo Alignment Film>

A composition 3 for forming a photo-alignment film was prepared as follows.

| Composition 3 for Forming Photo-Alignment Film | |
|---|---|
| Polymer P-1 described above | 100.00 parts by mass |
| Thermal acid generator D-1 shown below | 3.00 parts by mass |
| Diisopropylethylamine | 0.60 parts by mass |
| Butyl acetate | 953.12 parts by mass |
| Methyl ethyl ketone | 238.28 parts by mass |

Termal Acid Generator D-1

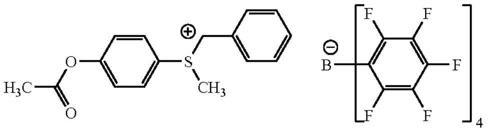

The prepared composition 3 for forming a photo-alignment film was sealed in a glass bottle, and stored at normal temperature in a sealed state for 7 days.

<Formation of Retardation Layer B>

One surface of a cellulose acylate film (TAC base material; manufactured by FUJIFILM Corporation, TG40) having a thickness of 40 μm was coated with the composition 3 for forming a photo-alignment film, which had been stored for 7 days, using a bar coater. Thereafter, the film coated with the composition 3 for forming a photo-alignment film was dried on a hot plate at 125° C. for 2 minutes to remove the solvent, and a precursor film having a thickness of 0.3 μm was formed. The obtained precursor film was irradiated with polarized ultraviolet rays (8 $mJ/cm^2$, using an ultra-high pressure mercury lamp) to form a photo-alignment film 3.

Next, the photo-alignment film 3 was coated with the following coating liquid B for a retardation layer using a bar coater. The coating film formed on the photo-alignment film 3 was heated to 120° C. with hot air and cooled to 60° C. Then, the coating film was irradiated with ultraviolet rays of 100 $mJ/cm^2$ at a wavelength of 365 nm using a high-pressure mercury lamp under a nitrogen atmosphere, and further irradiated with ultraviolet rays of 500 $mJ/cm^2$ while being heated to 120° C. By the above-described procedure, the alignment of the liquid crystal compound was fixed, and a retardation layer B was produced. Re(550) of the obtained laminate (cellulose acylate film/photo-alignment film 3/retardation layer B) was 270 nm, and the laminate was a λ/2 wavelength plate.

| Coating Liquid B for Retardation Layer | |
|---|---|
| Polymerizable liquid crystal compound L-1 shown below | 39.00 parts by mass |
| Polymerizable liquid crystal compound L-2 shown below | 39.00 parts by mass |
| Polymerizable liquid crystal compound L-3 shown below | 17.00 parts by mass |
| Polymerizable liquid crystal compound A-1 shown below | 5.00 parts by mass |
| Polymerization initiator S-1 (oxime type) shown below | 0.50 parts by mass |
| Surfactant F-3 shown below | 0.10 parts by mass |
| Cyclopentanone | 235.00 parts by mass |

Polymerizable Liquid Crystal Compound L-1

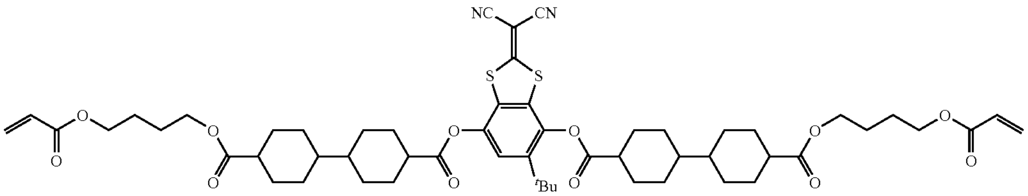

Polymerizable Liquid Crystal Compound L-2

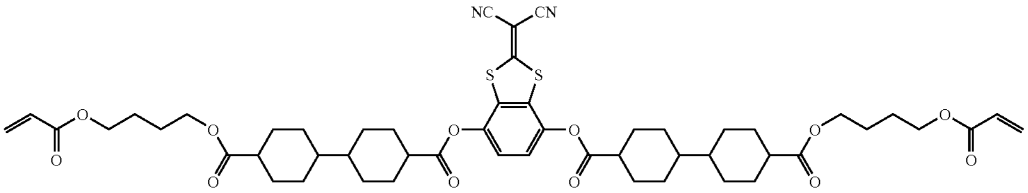

Polymerizable Liquid Crystal Compound L-3

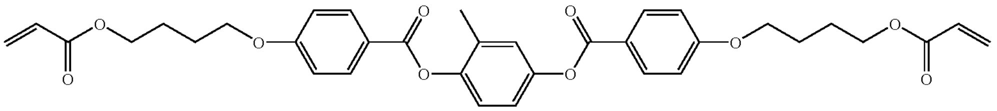

Polymerizable Liquid Crystal Compound A-1

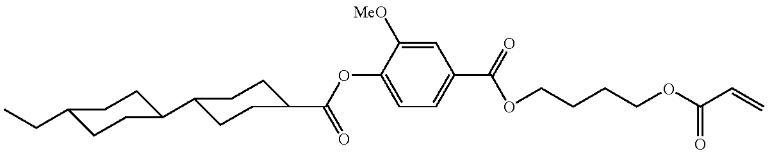

A-1

Polymerization Initiator S-1

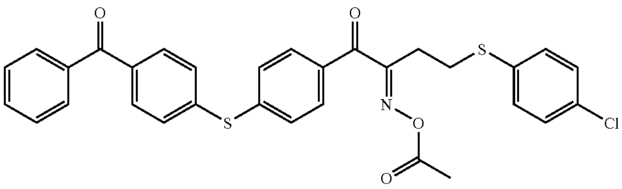

S-1

Surfactant F-3

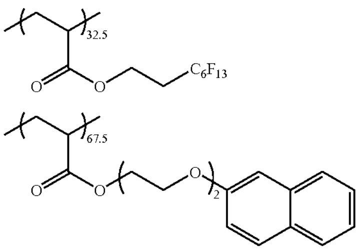

Production of Optical Laminate 2

An optical laminate 2 was produced in the same manner as in the production of the optical laminate 1, except that the retardation layer A was changed to the retardation layer B in the production of the optical laminate 1.

Example 3

Formation of Retardation Layer C

<Formation of Alignment Film 4>

One surface of a cellulose acylate film (TAC base material; manufactured by FUJIFILM Corporation, TG40) having a thickness of 40 μm was continuously coated with the following composition 4 for forming an alignment film using a #14 wire bar. The coating was dried with hot air at 60° C for 60 seconds and further dried with hot air at 100° C for 120 seconds.

| Composition of Composition 4 for Forming Alignment Film | |
|---|---|
| Modified polyvinyl alcohol PVA-1 shown above | 10 parts by mass |
| Water | 308 parts by mass |
| Methanol | 70 parts by mass |
| Isopropanol | 29 parts by mass |
| Photopolymerization initiator (IRGACURE 2959, manufactured by BASF SE) | 0.8 parts by mass |

<Formation of Retardation Layer C>

The alignment film 4 produced above was continuously subjected to a rubbing treatment. In this case, the longitudinal direction of the elongated film was parallel to the transport direction, and the angle formed between the longitudinal direction of the film and the rotation axis of the rubbing roller was 90° (in a case where the width direction of the film was defined as 0°, the longitudinal direction of the film was defined as 90°, and the counterclockwise direction was expressed as a positive value with reference to the width direction of the film observed from the alignment film side, the rotation axis of the rubbing roller was 0°).

The alignment film 4 produced above was continuously coated with a retardation layer coating liquid C containing a discotic liquid crystal compound with the following composition using a #5.0 wire bar to produce a retardation layer C. The film transportation speed (V) was 26 m/min. In order to dry the solvent of the coating liquid and to mature the alignment of the discotic liquid crystal compound, the film was heated with hot air at 130° C for 90 seconds, further heated with hot air at 100° C for 60 seconds, and irradiated with UV rays at 80° C to fix the alignment of the liquid crystal compound. The thickness of the retardation layer C was 2.2 μm, and Re at 550 nm was 270 nm. It was confirmed that the average tilt angle of the disc plane of the DLC compound with respect to the film surface was 90° and the DLC compound was vertically aligned with respect to the film surface. In addition, in a case where the angle of the slow axis of the retardation layer C was parallel to the rotation axis of the rubbing roller and the width direction of the film was defined as 0° (the longitudinal direction was 90°), the slow axis was 0° as viewed from the retardation layer C side.

| Composition of Retardation Layer Coating Liquid C | |
|---|---|
| Discotic liquid crystal-1 shown below | 80 parts by mass |
| Discotic liquid crystal-2 shown below | 20 parts by mass |
| Alignment film interface alignment agent-1 shown below | 0.55 parts by mass |
| Alignment film interface alignment agent-2 shown below | 0.05 parts by mass |
| Surfactant F-4 shown below | 0.09 parts by mass |
| Modified trimethylolpropane triacrylate | 10 parts by mass |
| Photopolymerization initiator (IRGACURE 907, manufactured by BASF SE) | 3.0 parts by mass |
| Methyl ethyl ketone | 200 parts by mass |

Discotic Liquid Crystal-1

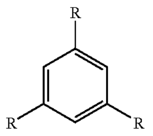

R =

-continued

Composition of Retardation Layer Coating Liquid C

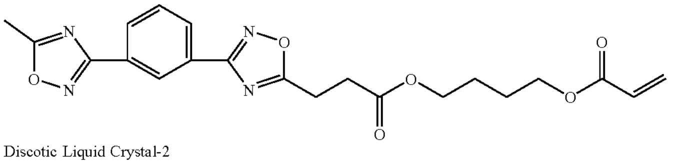

Discotic Liquid Crystal-2

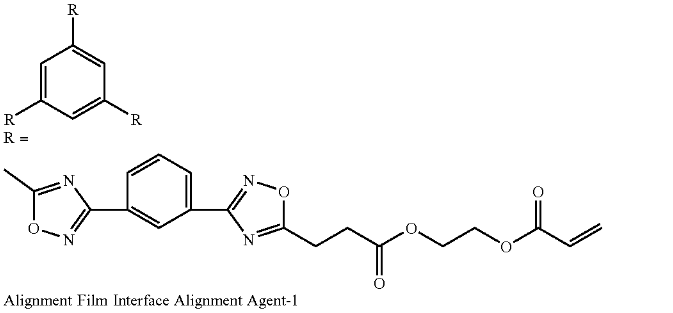

Alignment Film Interface Alignment Agent-1

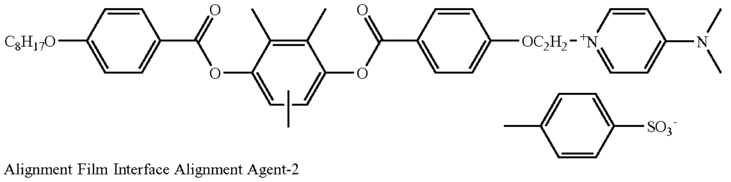

Alignment Film Interface Alignment Agent-2

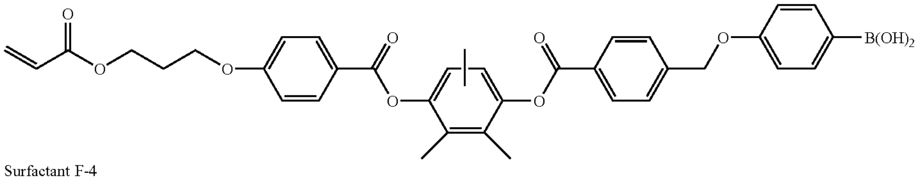

Surfactant F-4

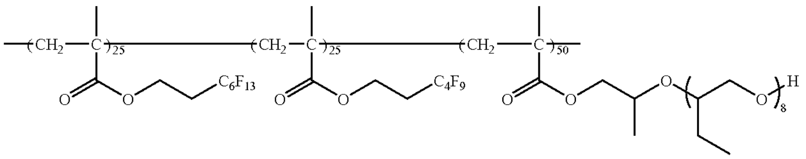

Production of Optical Laminate 3

The surface on which the above-described light absorption anisotropic layer A was formed and the surface on which the above-described retardation layer C was formed were bonded using a commercially available pressure sensitive adhesive (manufactured by Soken Chemical & Engineering Co., Ltd., SK2057), and then the peelable support of the retardation layer C was peeled off between the cellulose acylate film and the alignment film.

Next, the peeling surface and the surface on which the retardation layer A was formed were bonded using a commercially available pressure sensitive adhesive (manufactured by Soken Chemical & Engineering Co., Ltd., SK2057). In this case, the bonding was carried out so that the angle formed between the slow axis of the bonded retardation layer C and the slow axis of the retardation layer A was 45°. After the bonding, the peelable support of the retardation layer A was peeled off between the cellulose acylate film and the alignment film.

Next, the peeling surface and the surface on which a new light absorption anisotropic layer A different from the light absorption anisotropic layer A bonded as above was formed were bonded using a commercially available pressure sensitive adhesive (manufactured by Soken Chemical & Engineering Co., Ltd., SK2057) to produce an optical laminate 3.

Example 4

Production of Optical Laminate 4

An optical laminate 4 was produced in the same manner as in the production of the optical laminate 3, except that the retardation layer A was changed to the retardation layer B in the production of the optical laminate 3.

Example 5

Production of Optical Laminate 5

An optical laminate 5 was produced in the same manner as in the production of the optical laminate 3, except that the retardation layer A was changed to the retardation layer C in the production of the optical laminate 3.

Example 6

Production of Positive C-Plate

A cellulose acylate film (TAC base material; manufactured by FUJIFILM Corporation, TG40) having a thickness of 40 μm was coated with a liquid crystal composition D for forming a retardation layer produced as shown in the following table, using a #6 wire bar. The composition was heated with hot air at 40° C. for 60 seconds in order to dry the solvent of the composition and to mature the alignment of the liquid crystal compound. Next, the composition was irradiated with ultraviolet rays (300 mJ/$cm^2$) at 40° C. under a nitrogen purge at an oxygen concentration of 100 ppm to fix the alignment of the liquid crystal compound, and a positive C-plate was produced. Rth of the obtained positive C-plate was −120 nm.

| Composition of Liquid Crystal Composition D | |
|---|---|
| Rod-like liquid crystal compound-1 shown above | 83 parts by mass |
| Rod-like liquid crystal compound-3 shown below | 15 parts by mass |
| Rod-like liquid crystal compound-4 | 2 parts by mass |
| Polymerizable monomer (M-4) shown below | 8 parts by mass |
| Polymerization initiator (Irgacure 127, manufactured by BASF SE) | 2 parts by mass |
| Polymerization initiator (Irgacure OXE01, manufactured by BASF SE) | 4 parts by mass |
| Surfactant F-4 shown above | 0.18 parts by mass |
| Surfactant F-5 shown below | 0.24 parts by mass |
| Onium compound S01 shown below | 2 parts by mass |
| Polymer compound A-1 shown below | 5 parts by mass |
| Toluene | 621 parts by mass |
| Methyl ethyl ketone | 69 parts by mass |

Rod-Like Liquid Crystal Compound-3

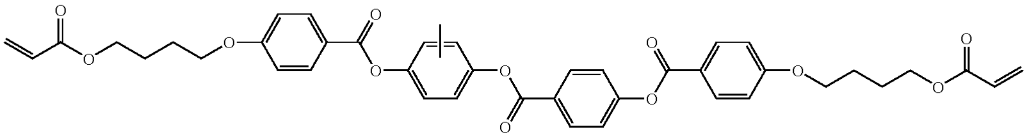

Rod-Like Liquid Crystal Compound-4

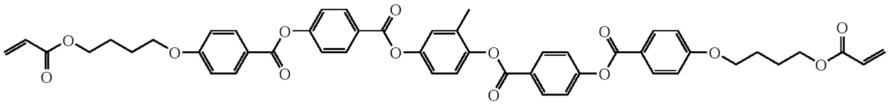 [SMILES: C=CC(=O)OCCCCOc1ccc(C(=O)Oc2ccc(C(=O)Oc3ccc(OC(=O)c4ccc(OC(=O)c5ccc(OCCCCOC(=O)C=C)cc5)cc4)c(C)c3)cc2)cc1]

Polymerizable Monomer (M-4)

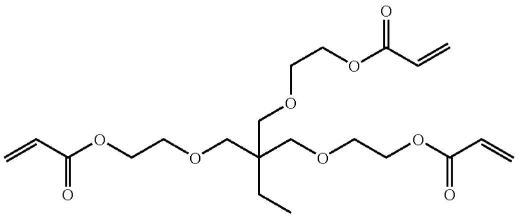 [SMILES: C=CC(=O)OCCOCC(CC)(COCCOC(=O)C=C)COCCOC(=O)C=C]

Surfactant F-5

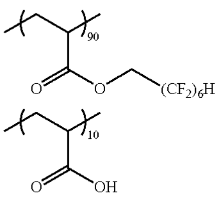

Onium Salt Compound S01

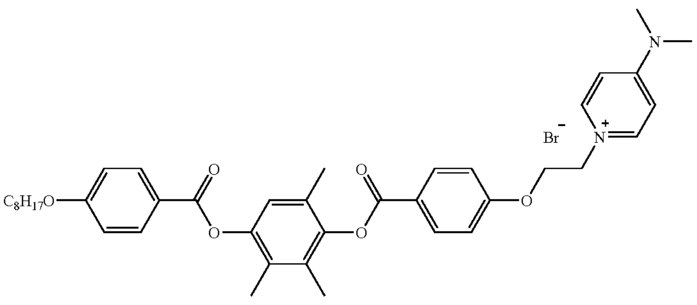

S01

-continued

Composition of Liquid Crystal Composition D

Polymer Compound A-1

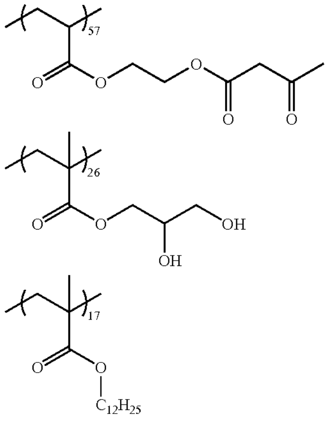

Production of Optical Laminate 6

The surface on which the above-described light absorption anisotropic layer A was formed and the surface on which the above-described retardation layer B was formed were bonded using a commercially available pressure sensitive adhesive (manufactured by Soken Chemical & Engineering Co., Ltd., SK2057), and then the peelable support of the retardation layer B was peeled off between the cellulose acylate film and the alignment film.

Next, the peeling surface and the surface on which the positive C-plate was formed were bonded using a commercially available pressure sensitive adhesive (manufactured by Soken Chemical & Engineering Co., Ltd., SK2057), and the peelable support of the positive C-plate was peeled off between the cellulose acylate film and the alignment film.

Next, the peeling surface and the surface on which a new retardation layer B different from the retardation layer B bonded as above was formed were bonded using a commercially available pressure sensitive adhesive (manufactured by Soken Chemical & Engineering Co., Ltd., SK2057). In this case, the bonding was carried out so that the angle formed between the slow axes of the two bonded retardation layers B was 45°. After the bonding, the peelable support of the retardation layer B was peeled off between the cellulose acylate film and the alignment film.

Next, the peeling surface and the surface on which a new light absorption anisotropic layer A different from the light absorption anisotropic layer A bonded as above was formed were bonded using a commercially available pressure sensitive adhesive (manufactured by Soken Chemical & Engineering Co., Ltd., SK2057) to produce an optical laminate 6.

Example 7

Formation of Light Absorption Anisotropic Layer B

A light absorption anisotropic layer B was produced in the same manner as in Example 1, except that the film thickness of the light absorption anisotropic layer was adjusted to 1.4 μm in Example 1. Using AxoScan OPMF-1 (manufactured by Opto Science, Inc.), a direction of a transmittance central axis was measured by measuring the transmittance of the produced light absorption anisotropic layer B while changing the polar angle and the azimuthal angle. As a result, the transmittance central axis was perpendicular to the layer surface.

Production of Optical Laminate 7

The surface on which the above-described light absorption anisotropic layer B was formed and the surface on which the above-described retardation layer A was formed were bonded using a commercially available pressure sensitive adhesive (manufactured by Soken Chemical & Engineering Co., Ltd., SK2057), and then the peelable support of the retardation layer A was peeled off between the cellulose acylate film and the alignment film.

Next, the peeling surface and the surface on which a new light absorption anisotropic layer B different from the light absorption anisotropic layer B bonded as above was formed were bonded using a commercially available pressure sensitive adhesive (manufactured by Soken Chemical & Engineering Co., Ltd., SK2057).

Next, the light absorption anisotropic layer B and the surface on which a new retardation layer A different from the retardation layer A bonded as above was formed were bonded using a commercially available pressure sensitive adhesive (manufactured by Soken Chemical & Engineering Co., Ltd., SK2057). In this case, the bonding was carried out so that the angle formed between the slow axes of the two bonded retardation layers A was 45°. After the bonding, the peelable support of the retardation layer A was peeled off between the cellulose acylate film and the alignment film in the same manner as described above.

Next, the peeling surface and the surface on which a new light absorption anisotropic layer A different from the light absorption anisotropic layer A bonded as above was formed were bonded using a commercially available pressure sensitive adhesive (manufactured by Soken Chemical & Engineering Co., Ltd., SK2057) to produce an optical laminate 7.

Example 8

Formation of Light Absorption Anisotropic Layer C

A light absorption anisotropic layer C was produced in the same manner as in Example 1, except that the film thickness of the light absorption anisotropic layer was adjusted to 0.8 μm in Example 1. Using AxoScan OPMF-1 (manufactured by Opto Science, Inc.), a direction of a transmittance central axis was measured by measuring the transmittance of the produced light absorption anisotropic layer C while changing the polar angle and the azimuthal angle. As a result, the transmittance central axis was perpendicular to the layer surface.

Production of Optical Laminate 8

The surface on which the above-described light absorption anisotropic layer C was formed and the surface on which the above-described retardation layer A was formed were bonded using a commercially available pressure sensitive adhesive (manufactured by Soken Chemical & Engineering Co., Ltd., SK2057), and then the peelable support of the retardation layer A was peeled off between the cellulose acylate film and the alignment film.

Next, the peeling surface and the surface on which a new light absorption anisotropic layer C different from the light absorption anisotropic layer C bonded as above was formed were bonded using a commercially available pressure sensitive adhesive (manufactured by Soken Chemical & Engineering Co., Ltd., SK2057).

Next, the surface of the bonded light absorption anisotropic layer C on the support side and the surface on which a new retardation layer A different from the retardation layer A bonded as above was formed were bonded using a commercially available pressure sensitive adhesive (manufactured by Soken Chemical & Engineering Co., Ltd., SK2057). In this case, the bonding was carried out so that the angle formed between the slow axes of the two bonded retardation layers A was 22.5°. After the bonding, the peelable support of the retardation layer A was peeled off between the cellulose acylate film and the alignment film in the same manner as described above.

Next, the bonding and the peeling of the light absorption anisotropic layer C, retardation layer A, light absorption anisotropic layer C, and retardation layer A were repeated in this order in the same manner as described above. However, the four bonded retardation layers A were bonded while changing their slow axis directions by 22.5°. For example, in a case where the slow axis of a retardation layer A bonded first was defined as 0°, four retardation layers A were bonded so that the slow axes thereof were 0°, 22.5°, 45°, and 67.5° in the order of bonding.

Example 9

Formation of Retardation Layer D

A retardation layer D was produced in the same manner as in Example 2, except that the coating amount of the coating liquid B for a retardation layer was adjusted in the formation of the retardation layer B of Example 2. In this case, the coating amount was adjusted so that Re(550) of the obtained laminate (cellulose acylate film/photo-alignment film 3/retardation layer D) was 135 nm.

Next, two laminates (cellulose acylate film/photo-alignment film 3/retardation layer D) were obtained as above and bonded using a commercially available pressure sensitive adhesive (manufactured by Soken Chemical & Engineering Co., Ltd., SK2057) to produce an optical laminate (cellulose acylate film/photo-alignment film 3/retardation layer D/SK2057/cellulose acylate film/photo-alignment film 3/etardation layer D). Re(550) of the obtained optical laminate was 270 nm, and the optical laminate was a λ/2 wavelength plate.

Production of Optical Laminate 9

An optical laminate 9 was produced in the same manner as in Example 2, except that the retardation layer B was changed to the above-described optical laminate (cellulose acylate film/photo-alignment film 3/retardation layer D/SK2057/cellulose acylate film/photo-alignment film 3/retardation layer D) in the production of the optical laminate 2.

Example 10

Production of Optical Laminate 10

An optical laminate 10 was produced in the same manner as in Example 4, except that the retardation layer B was changed to the above-described optical laminate (cellulose acylate film/photo-alignment film 3/retardation layer D/SK2057/cellulose acylate film/photo-alignment film 3/retardation layer D) in the production of the optical laminate 4.

Comparative Example 1

Production of Optical Laminate 1B

The surface on which the above-described light absorption anisotropic layer A was formed and the surface on which the above-described retardation layer A was formed were bonded using a commercially available pressure sensitive adhesive (manufactured by Soken Chemical & Engineering Co., Ltd., SK2057), and then the peelable support of the retardation layer A was peeled off between the cellulose acylate film and the alignment film.

Next, the peeling surface and the surface on which a new light absorption anisotropic layer A different from the light absorption anisotropic layer A bonded as above was formed were bonded using a commercially available pressure sensitive adhesive (manufactured by Soken Chemical & Engineering Co., Ltd., SK2057) to produce an optical laminate 1B.

Comparative Example 2

Production of Optical Laminate 2B

The surface on which the above-described light absorption anisotropic layer A was formed and the surface on which the above-described retardation layer A was formed were bonded using a commercially available pressure sensitive adhesive (manufactured by Soken Chemical & Engineering Co., Ltd., SK2057), and then the peelable support of the retardation layer A was peeled off between the cellulose acylate film and the alignment film.

Next, the peeling surface and the surface on which a new retardation layer A different from the retardation layer A bonded as above was formed were bonded using a commercially available pressure sensitive adhesive (manufactured by Soken Chemical & Engineering Co., Ltd., SK2057). In this case, the bonding was carried out so that the angle formed between the slow axes of the two bonded retardation layers A was 30°. After the bonding, the peelable support of the retardation layer A was peeled off between the cellulose acylate film and the alignment film in the same manner as described above.

Next, the peeling surface and the surface on which a new light absorption anisotropic layer A different from the light absorption anisotropic layer A bonded as above was formed were bonded using a commercially available pressure sensitive adhesive (manufactured by Soken Chemical & Engineering Co., Ltd., SK2057) to produce an optical laminate 2B.

Comparative Example 3

Production of Polarizing Plate

A polarizing plate in which a thickness of a polarizer was 8 μm and one surface of the polarizer was exposed was produced by the same method as that for a polarizing plate 02 with a one-surface protective film, described in WO2015/166991A.

Production of Optical Laminate 3B

The surface on which the above-described light absorption anisotropic layer A was formed and the surface on which the above-described polarizer was formed were bonded using a commercially available pressure sensitive adhesive (manufactured by Soken Chemical & Engineering Co., Ltd., SK2057) to produce an optical laminate 3B.

Evaluation of Optical Laminate

As a plane light source, an LED viewer pro HR-2 (manufactured by FUJIFILM Corporation) was used, and the optical laminate was placed on the plane light source to perform the following evaluation.

(1) Light Transmitting Properties

The optical laminate was placed on the plane light source, and the darkness when viewed from a specific direction (front direction) was evaluated according to the following standards. The results are shown in Tables 1 to 3 below.

Standards

A: It feels slightly darker compared to the brightness when directly viewing the plane light source, but it is not noticeable.

B: It feels considerably darker compared to the brightness when directly viewing the plane light source, which is noticeable.

(2) Light Shielding Performance

The optical laminate was placed on the plane light source, and a change in darkness when viewed from a direction at a polar angle of 45° was evaluated according to the following standards. The results are shown in Tables 1 to 3 below.

Standards

A: No change is observed in darkness when the azimuthal angle is changed.

B: There is a slight change in darkness when the azimuthal angle is changed, but it is not noticeable.

C: A change is felt in darkness when the azimuthal angle is changed, but is not very noticeable.

D: A change is noticeable in darkness when the azimuthal angle is changed.

E: A change is very noticeable in darkness when the azimuthal angle is changed.

The optical laminate was placed on the plane light source, and the overall darkness when viewed from a direction at a polar angle of 45° was evaluated according to the following standards. The results are shown in Tables 1 to 3 below.

Standards

AA: The overall impression is very dark, and the light shielding performance is excellent.

A: The overall impression is dark, and the light shielding performance is good.

B: Slight light leakage is felt overall, and the light shielding performance is slightly low.

(3) Evaluation of Tint

A sample was placed on the plane light source, and a change in tint when viewed by changing the azimuthal angle in a direction at a polar angle of 45° was evaluated according to the following standards. The results are shown in Tables 1 to 3 below.

AA: No change is felt in tint.

A: There is only a slight change in tint, which is not noticeable.

B: The change in tint is small and hardly noticeable.

C: The change in tint is large and noticeable.

TABLE 1

| | Example 1 Optical Laminate 1 | Example 2 Optical Laminate 2 | Example 3 Optical Laminate 3 | Example 4 Optical Laminate 4 | Example 5 Optical Laminate 5 |
|---|---|---|---|---|---|
| | Light Absorption Anisotropic Layer A (first) | Light Absorption Anisotropic Layer A (first) | Light Absorption Anisotropic Layer A (first) | Light Absorption Anisotropic Layer A (first) | Light Absorption Anisotropic Layer A (first) |
| | Retardation Layer A (first) Axis: 0° ※ | Retardation Layer B (first) Axis: 0° | Retardation Layer C (first) Axis: 0° | Retardation Layer C (first) Axis: 0° | Retardation Layer C (first) Axis: 0° |
| | Retardation Layer A (second) Axis: 45° | Retardation Layer B (second) Axis: 45° | Retardation Layer A (second) Axis: 45° | Retardation Layer B (second) Axis: 45° | Retardation Layer C (second) Axis: 45° |
| | Light Absorption Anisotropic Layer A (second) | Light Absorption Anisotropic Layer A (second) | Light Absorption Anisotropic Layer A (second) | Light Absorption Anisotropic Layer A (second) | Light Absorption Anisotropic Layer A (second) |

TABLE 1-continued

| | | Example 1 Optical Laminate 1 | Example 2 Optical Laminate 2 | Example 3 Optical Laminate 3 | Example 4 Optical Laminate 4 | Example 5 Optical Laminate 5 |
|---|---|---|---|---|---|---|
| Light Transmitting Properties | | A | A | A | A | A |
| Light Shielding Performance | Change in Darkness When Viewed from Direction at Polar Angle of 45° | B | B | A | A | B |
| | Overall Darkness When Viewed from Direction at Polar Angle of 45° | A | A | A | AA | A |
| Change in Tint | | C | B | A | AA | C |

※ The phrase [Axis: 0°] means that the angle of the slow axis of the retardation layer listed in the column is defined as a reference.

TABLE 2

| | | Example 6 Optical Laminate 6 | Example 7 Optical Laminate 7 | Example 8 Optical Laminate 8 | Comparative Example 1 Optical Laminate 1B | Comparative Example 2 Optical Laminate 2B | Comparative Example 3 Optical Laminate 3B |
|---|---|---|---|---|---|---|---|
| | | Light Absorption Anisotropic Layer A (first) Retardation Layer B (first) Axis: 0° ※ Positive C-Plate Retardation Layer B (second) Axis: 45° Light Absorption Anisotropic Layer A (second) | Light Absorption Anisotropic Layer B (first) Retardation Layer A (first) Axis: 0° Light Absorption Anisotropic Layer B (third) Retardation Layer A (second) Axis: 45° Light Absorption Anisotropic Layer B (second) | Light Absorption Anisotropic Layer C (first) Retardation Layer A (first) Axis: 0° Light Absorption Anisotropic Layer C (third) Retardation Layer A (second) Axis: 22.5° Light Absorption Anisotropic Layer C (second/first combination) Retardation Layer A (first) Axis: 45° Light Absorption Anisotropic Layer C (third) Retardation Layer A (second) Axis: 67.5° Light Absorption Anisotropic Layer C (second) | Light Absorption Anisotropic Layer A (first) Retardation Layer A (first) Axis: 0° Light Absorption Anisotropic Layer A (second) | Light Absorption Anisotropic Layer A (first) Retardation Layer A (first) Axis: 0° Retardation Layer A (second) Axis: 30° Light Absorption Anisotropic Layer A (second) | Light Absorption Anisotropic Layer A (first) Retardation Polarizing Plate |
| Light Transmitting Properties | | A | A | A | A | A | B |
| Light Shielding Performance | Change in Darkness When Viewed from Direction at Polar Angle of 45° | A | C | B | E | D | E |
| | Overall Darkness When Viewed from Direction at Polar Angle of 45° | AA | A | A | B | B | A |
| Change in Tint | | AA | A | AA | C | C | A |

※ The phrase [Axis: 0°] means that the angle of the slow axis of the retardation layer listed in the column is defined as a reference.

TABLE 3

| | | Example 9<br>Optical Laminate 9 | Example 10<br>Optical Laminate 10 |
|---|---|---|---|
| | | Light Absorption Anisotropic Layer A (first)<br>Retardation Layer D Axis: 0°※ } First<br>Retardation Layer D Axis: 0° } First<br>Retardation Layer D Axis: 45° } Second<br>Retardation Layer D Axis: 45° } Second<br>Light Absorption Anistropic Layer D (second) | Light Absorption Anisotropic Layer A (first)<br>Retardation Layer C Axis: 0° First<br>Retardation Layer D Axis: 45° } Second<br>Retardation Layer D Axis: 45° } Second<br>Light Absorption Anistropic Layer D (second) |
| Light Transmitting Properties | | A | A |
| Light Shielding Performance | Change in Darkness When Viewed from Direction at Polar Angle of 45° | B | A |
| | Overall Darkness When Viewed from Direction at Polar Angle of 45° | A | AA |
| Change in Tint | | B | AA |

※ The phrase [Axis: 0°] means that the angle of the slow axis of the retardation layer listed in the column is defined as a reference.

From the results shown in Tables 1 to 3, it was found that, in a case where any one of the first retardation layer or the second retardation layer was not provided, the light shielding properties in a direction other than a specific direction deteriorated (Comparative Example 1).

In addition, it was found that, in a case where the angle formed between the slow axis of the first retardation layer and the slow axis of the second retardation layer was outside the range of 45°±10°, the light shielding properties in a direction other than a specific direction deteriorated (Comparative Example 2).

In addition, it was found that an optical laminate in which the light absorption anisotropic layer and the polarizing plate were bonded together had poor light transmitting properties in a specific direction (Comparative Example 3).

On the other hand, it was found that, in a case where both the first retardation layer and the second retardation layer were λ/2 wavelength plates and the angle formed between the slow axis of the first retardation layer and the slow axis of the second retardation layer was within a range of 45°±10°, the light transmitting properties in a specific direction were excellent and the light shielding properties in all directions other than the specific direction were good in using for an image display device (Examples 1 to 10).

In addition, from the comparison between Examples 1 and 2, it was found that, in a case where the first retardation layer and the second retardation layer were layers formed of a composition containing a rod-like liquid crystal compound having reverse wavelength dispersibility, it was possible to suppress a change in tint.

In addition, from the comparison between Examples 1, 3, and 4, it was found that, in a case where any one of the first retardation layer or the second retardation layer is a layer formed of a composition containing a rod-like liquid crystal compound and the other is a layer formed of a composition containing a disk-like liquid crystal compound, the light shielding properties in a direction other than a specific direction were improved and it was thus also possible to suppress a change in tint.

In addition, from the comparison between Examples 3 and 4, it was found that, in a case where any one of the first retardation layer or the second retardation layer is a layer formed of a composition containing a rod-like liquid crystal compound having reverse wavelength dispersibility and the other is a layer formed of a composition containing a disk-like liquid crystal compound, the light shielding properties in a direction other than a specific direction were further improved and it was thus also possible to further suppress a change in tint.

In addition, from the comparison between Examples 1 and 6, it was found that, in a case where a positive C-plate was provided between the first retardation layer and the second retardation layer, the light shielding properties in a direction other than a specific direction were improved and it was thus also possible to suppress a change in tint.

In addition, from the comparison between Examples 1 and 7, it was found that, in a case where, other than the first light absorption anisotropic layer and the second light absorption anisotropic layer, a third light absorption anisotropic layer containing a dichroic substance was provided between the first retardation layer and the second retardation layer, it was possible to suppress a change in tint.

EXPLANATION OF REFERENCES

10: optical laminate
12: first light absorption anisotropic layer
14: first retardation layer
14S: slow axis of first retardation layer
16: second retardation layer
16S: slow axis of second retardation layer
18: second light absorption anisotropic layer
22, 28: dichroic substance
24, 26: liquid crystal compound

What is claimed is:

1. An optical laminate comprising in order:
a first light absorption anisotropic layer;
a first retardation layer;
a second retardation layer; and
a second light absorption anisotropic layer,
wherein the first retardation layer and the second retardation layer are λ/2 wavelength plates,
an angle formed between a slow axis of the first retardation layer and a slow axis of the second retardation layer is within a range of 45°±10°,
the first light absorption anisotropic layer and the second light absorption anisotropic layer contain a dichroic substance,
an angle formed between a transmittance central axis of the first light absorption anisotropic layer and a normal direction of a surface of the first light absorption anisotropic layer is 0° or more and 45° or less, and
an angle formed between a transmittance central axis of the second light absorption anisotropic layer and a normal direction of a surface of the second light absorption anisotropic layer is 0° or more and 45° or less.

2. The optical laminate according to claim 1,
wherein the transmittance central axis of the first light absorption anisotropic layer and the transmittance central axis of the second light absorption anisotropic layer are parallel to each other.

3. The optical laminate according to claim 2,
wherein the first retardation layer and the second retardation layer are layers formed of a composition containing a disk-like liquid crystal compound.

4. The optical laminate according to claim 2,
wherein the first retardation layer and the second retardation layer are layers formed of a composition containing a rod-like liquid crystal compound having reverse wavelength dispersibility.

5. The optical laminate according to claim 2,
wherein any one of the first retardation layer or the second retardation layer is a layer formed of a composition containing a rod-like liquid crystal compound and the other is a layer formed of a composition containing a disk-like liquid crystal compound.

6. The optical laminate according to claim 5,
wherein the rod-like liquid crystal compound is a rod-like liquid crystal compound having reverse wavelength dispersibility.

7. The optical laminate according to claim 2,
wherein at least one of the first retardation layer or the second retardation layer is a layer formed of two retardation layers.

8. The optical laminate according to claim 2,
wherein a positive C-plate is provided between the first retardation layer and the second retardation layer.

9. The optical laminate according to claim 2,
wherein a third light absorption anisotropic layer containing a dichroic substance is provided between the first retardation layer and the second retardation layer, and
an angle formed between a transmittance central axis of the third light absorption anisotropic layer and a normal direction of a surface of the third light absorption anisotropic layer is 0° or more and 45° or less.

10. The optical laminate according to claim 2,
wherein the first retardation layer and the second retardation layer are in direct contact with each other or are laminated via only at least one of an adhesive layer, a pressure sensitive adhesive layer, or an alignment film.

11. An image display device comprising:
the optical laminate according to claim 2.

12. The optical laminate according to claim 1,
wherein the first retardation layer and the second retardation layer are layers formed of a composition containing a disk-like liquid crystal compound.

13. The optical laminate according to claim 1,
wherein the first retardation layer and the second retardation layer are layers formed of a composition containing a rod-like liquid crystal compound having reverse wavelength dispersibility.

14. The optical laminate according to claim 1,
wherein any one of the first retardation layer or the second retardation layer is a layer formed of a composition containing a rod-like liquid crystal compound and the other is a layer formed of a composition containing a disk-like liquid crystal compound.

15. The optical laminate according to claim 14,
wherein the rod-like liquid crystal compound is a rod-like liquid crystal compound having reverse wavelength dispersibility.

16. The optical laminate according to claim 1,
wherein at least one of the first retardation layer or the second retardation layer is a layer formed of two retardation layers.

17. The optical laminate according to claim 1,
wherein a positive C-plate is provided between the first retardation layer and the second retardation layer.

18. The optical laminate according to claim 1,
wherein a third light absorption anisotropic layer containing a dichroic substance is provided between the first retardation layer and the second retardation layer, and
an angle formed between a transmittance central axis of the third light absorption anisotropic layer and a normal direction of a surface of the third light absorption anisotropic layer is 0° or more and 45° or less.

19. The optical laminate according to claim 1,
wherein the first retardation layer and the second retardation layer are in direct contact with each other or are laminated via only at least one of an adhesive layer, a pressure sensitive adhesive layer, or an alignment film.

20. An image display device comprising:
the optical laminate according to claim 1.

* * * * *